(12) United States Patent
Buchanan et al.

(10) Patent No.: US 8,887,274 B2
(45) Date of Patent: Nov. 11, 2014

(54) DIGITAL FORENSICS

(75) Inventors: William Johnston Buchanan, Edinburgh (GB); Jamie Robert Graves, Edinburgh (GB); Niladri Bose, Edinburgh (GB)

(73) Assignee: Inquisitive Systems Limited, Edinburgh (GB)

( * ) Notice: Subject to any disclaimer, the term of this patent is extended or adjusted under 35 U.S.C. 154(b) by 102 days.

(21) Appl. No.: 13/063,003

(22) PCT Filed: Sep. 9, 2009

(86) PCT No.: PCT/GB2009/051142
§ 371 (c)(1),
(2), (4) Date: May 31, 2011

(87) PCT Pub. No.: WO2010/029346
PCT Pub. Date: Mar. 18, 2010

(65) Prior Publication Data
US 2012/0011153 A1    Jan. 12, 2012

Related U.S. Application Data

(60) Provisional application No. 61/116,681, filed on Nov. 21, 2008.

(30) Foreign Application Priority Data

Sep. 10, 2008  (GB) .................................. 0816556.5

(51) Int. Cl.
*G06F 21/55* (2013.01)

(52) U.S. Cl.
CPC .................................... *G06F 21/552* (2013.01)
USPC ................... 726/22; 726/23; 726/24; 726/26; 709/224

(58) Field of Classification Search
CPC ....... G06F 21/126; G06F 21/50; G06F 21/56; G06F 21/566; H04L 63/20; H04L 63/1416
USPC ................... 726/22, 23, 26; 709/223; 703/21; 702/20

See application file for complete search history.

(56) References Cited

U.S. PATENT DOCUMENTS

| 6,742,124 B1 * | 5/2004 | Kilpatrick et al. .............. 726/23 |
| 2002/0065695 A1 | 5/2002 | Francoeur et al. |

(Continued)

FOREIGN PATENT DOCUMENTS

EP      0 985 995 A1    3/2000

OTHER PUBLICATIONS

Hofmeyr, Steven A., et al., "Intrusion Detection using Sequences of System Calls", Journal of Computer Security, vol. 6, No. 3, Aug. 18, 1998, 25 pages.

(Continued)

*Primary Examiner* — Andrew Nalven
*Assistant Examiner* — Huan V Doan
(74) *Attorney, Agent, or Firm* — W. Kevin Ransom; Moore & Van Allen PLLC

(57) ABSTRACT

New digital forensic techniques and systems are disclosed. System call information is collected from a device under test (DUT) and converted to a sequence format. Thereafter, sequence alignment methods and tools can be used to investigate and identify patterns of behavior that are suspicious.

16 Claims, 23 Drawing Sheets

(56) References Cited

U.S. PATENT DOCUMENTS

| | | | |
|---|---|---|---|
| 2004/0230530 A1 | 11/2004 | Searl et al. | |
| 2005/0097366 A1 | 5/2005 | McCreight et al. | |
| 2006/0053498 A1* | 3/2006 | Bejanin et al. | 800/8 |
| 2006/0069540 A1 | 3/2006 | Krutz | |
| 2006/0101413 A1* | 5/2006 | Kinno et al. | 717/127 |
| 2007/0107052 A1* | 5/2007 | Cangini et al. | 726/22 |
| 2007/0139231 A1 | 6/2007 | Wallia et al. | |
| 2007/0226170 A1 | 9/2007 | Sun | |
| 2007/0261120 A1* | 11/2007 | Arbaugh et al. | 726/26 |
| 2007/0300301 A1 | 12/2007 | Cangini et al. | |
| 2008/0065811 A1 | 3/2008 | Jahangiri | |
| 2008/0120720 A1* | 5/2008 | Guo et al. | 726/23 |
| 2009/0106012 A1* | 4/2009 | Liu | 703/21 |

OTHER PUBLICATIONS

Coull, S., et al., "Intrusion detection: a bioinformatics approach", Proceedings of the 19th Annual Computer Security Applications Conference, IEEE, Dec. 8, 2003, pp. 24-33.

Coull, et al., "Sequence Alignment for masquerade detection", Computational Statistics and Data Analysis, North-Holland, Amsterdam, NL, vol. 52, No. 8, Feb. 5, 2008, pp. 4116-4131.

Wespi, A., et al., "An intrusion-detection system based on the teiresias pattern discovery algorithm", EICAR 1999, 15 pages.

Florez-Larrahondo, German, et al., Intrusion Detection Using Text Processing Techniques with a Binary-Weighted Cosine Metric, Journal of Information Assurance and Security, 2006, pp. 59-77.

Bing, Yue, et al., "An Anomaly Intrusion Detection Method Using Fourier Transform", Journal of Electronics (China), vol. 21, No. 2, Mar. 2004, pp. 135-139.

Karlin, S., et al., "Methods for assessing the statistical significance of molecular sequence features by using general scoring schemes", Proceedings of the National Academy of Sciences of USA, National Academy of Science, Washington, DC, US, vol. 87, Mar. 1, 1990, pp. 2264-2268.

Forrest, Stephanie, et al., "A Sense of Self for Unix Processes", 1996 IEEE Symposium on Security and Privacy, IEEE Computer Society Press, Los Alamitos, CA, pp. 120-128 (1996).

Forrest, S., et al., "Self-Nonself Discrimination in a Computer", Proceedings of 1994 IEEE Symposium on Research in Security and Privacy (in press), 11 pages.

Schafer, Andreas, "International Search Report", for PCT/GB2009/051142, as mailed Dec. 8, 2009, 4 pages.

* cited by examiner

|   | S | T | R | A | I | N | E | D |
|---|---|---|---|---|---|---|---|---|
| 0 | ←-1 | ←-2 | ←-3 | ←-4 | ←-5 | ←-6 | ←-7 | ←-8 |

| | | S | T | R | A | I | N | E | D |
|---|---|---|---|---|---|---|---|---|---|
| | 0 | ←-1 | ←-2 | ←-3 | ←-4 | ←-5 | ←-6 | ←-7 | ←-8 |
| B | ↑-1 | | | | | | | | |
| R | ↑-2 | | | | | | | | |
| A | ↑-3 | | | | | | | | |
| I | ↑-4 | | | | | | | | |
| N | ↑-5 | | | | | | | | |

Fig. 3

| | | S | T | R | A | I | N | E | D |
|---|---|---|---|---|---|---|---|---|---|
| | 0 | ←-1 | ←-2 | ←-3 | ←-4 | ←-5 | ←-6 | ←-7 | ←-8 |
| B | ↑-1 | ↖-1 | ↖-2 | | | | | | |

Fig. 4

|   | S | T | R | A | I | N | E | D |
|---|---|---|---|---|---|---|---|---|
| | 0 | ←-1 | ←-2 | ←-3 | ←-4 | ←-5 | ←-6 | ←-7 | ←-8 |
| B | ↑-1 | ↖-1 | ↖-2 | ↖-3 | ↖-4 | ↖-5 | ↖-6 | ↖-7 | ↖-6 |
| R | ↑-2 | ↖-2 | ↖-2 | ↖-1 | ←-2 | ←-3 | ←-4 | ←-5 | ←-6 |
| A | ↑-3 | ↖-3 | ↖-3 | ↑-2 | ↖-0 | ←-1 | ←-2 | ←-3 | ←-4 |
| I | ↑-4 | ↖-4 | ↖-4 | ↑-3 | ↑-1 | ↖1 | ←0 | ←-1 | ←-2 |
| N | ↑-5 | ↖-5 | ↖-5 | ↖-4 | ↖-2 | ↑0 | ↖2 | ←1 | ←0 |

*Fig. 5*

|   | S | T | R | A | I | N | E | D |
|---|---|---|---|---|---|---|---|---|
| | 0 | 0 | 0 | 0 | 0 | 0 | 0 | 0 | 0 |
| B | 0 | 0 | 0 | 0 | 0 | 0 | 0 | 0 | 0 |
| R | 0 | 0 | 0 | ↖1 | 0 | 0 | 0 | 0 | 0 |
| A | 0 | 0 | 0 | 0 | ↖2 | ←1 | 0 | 0 | 0 |
| I | 0 | 0 | 0 | 0 | ↑1 | ↖3 | ←2 | ←1 | 0 |
| N | 0 | 0 | 0 | 0 | 0 | ↑2 | ↖4 | ←3 | ←2 |

```
>fingerprint_4_47_17_532
         Length = 80

Score = 110 (107.0 bits), Expect = 2.9e-25, P = 2.9e-25
 Identities = 63/63 (100%), Positives = 22/63 (34%)

Query:   2016  MLLPLPHLPHLLPLQLQLPFCLLPELSLPHLPHLPHSLDALLLQAFCCLPHLILLILPHL  2077
               M      H   H    Q Q    C     E S  H  H  HS A   QA CC  H  I  I  H
Sbjct:     17  MLLPLPHLPHLLPLQLQLPFCLLPELSLPHLPHLPHSLDALLLQAFCCLPHLILLILPHL  76

Query:   2078  PFC  2080
               C
Sbjct:     77  PFC  79

Score = 24 (25.2 bits), Expect = 1.9, P = 0.85
 Identities = 9/12 (75%), Positives = 6/12 (50%)

Query:   2142  HLPHLPHLPHLI  2153
               +   H   H   H++
Sbjct:     43  SLPHLPHLPHSL  54
```

*Fig. 17*

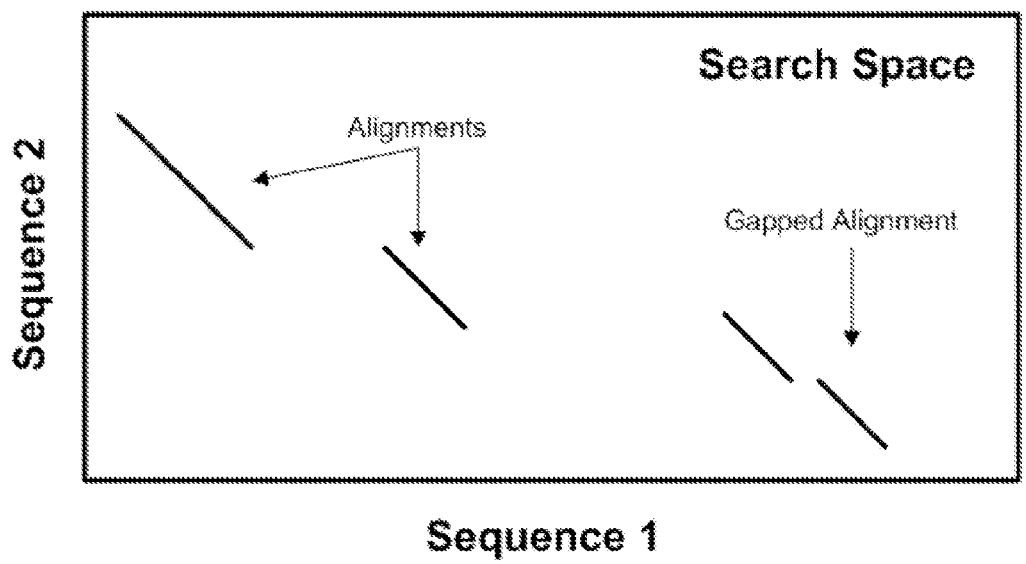

*Fig. 18*

NtFsControlFile
NtOpenFile
NtQueryInformationFile
NtReadFile
NtWriteFile
NtDeviceIoControlFile
NtCreateFile
NtSetInformationFile
NtQueryAttributesFile
NtQueryDirectoryFile
NtQueryVolumeInformationFile
NtLockFile
NtQueryFullAttributesFile
NtUnlockFile
NtFlushBuffersFile
NtNotifyChangeDirectoryFile

*Fig. 21*

```
                                        Time-based proximity
                                      indicates pattern scoring
                                      ───────────────▶
                                          LPSSLD
                                          LPSSLD
                                          LPSSLD
                Generation-based          LPHLPH
                substitution shows        LPSSLD
                biological evolution      LPSSLD
                                          LPSSLD
                                          LPSSLD
                                              │
                                              ▼
```

*Fig. 22*

```
                                                             Smallest
                                                               Sum
                                                      High   Probability
Sequences producing High-scoring Segment Pairs:       Score   P(N)       N sequence 4_47_17_532                                   460   5.3e-64     1

>sequence 4_47_17_532
        Length = 80

Score = 460 (223.3 bits), Expect = 5.3e-64, P = 5.3e-64
 Identities = 80/80 (100%), Positives = 80/80 (100%)

Query:  2002 PPFPPFPPFPPFPPFPFPMLLPLPHLPHLLPLQLQLPFCLLPELSLPHLPHLPHSLDALLLQ 2061
             PPFPPFPPFPPFPPFPFPMLLPLPHLPHLLPLQLQLPFCLLPELSLPHLPHLPHSLDALLLQ
Sbjct:     1 PPFPPFPPFPPFPPFPFPMLLPLPHLPHLLPLQLQLPFCLLPELSLPHLPHLPHSLDALLLQ   60

Query:  2062 AFCCLPHLILLILPHLPFCL 2081
             AFCCLPHLILLILPHLPFCL
Sbjct:    61 AFCCLPHLILLILPHLPFCL  80
```

*Fig. 23*

```
                                                              Smallest
                                                                Sum
                                                      High   Probability
Sequences producing High-scoring Segment Pairs:       Score  P(N)        N sequence 4_47_17_532                                   194   1.5e-25     1

>sequence 4_47_17_532
         Length = 80

Score = 194 (95.7 bits), Expect = 1.5e-25, P = 1.5e-25
 Identities = 35/38 (92%), Positives = 35/38 (92%)

Query:   1933 MLLPLPHLPHLLPLQLQLPFCLLPSPELPHLPHLPHSL 1970
              MLLPLPHLPHLLPLQLQLPFCLLP   LPHLPHLPHSL
Sbjct:     17 MLLPLPHLPHLLPLQLQLPFCLLPELSLPHLPHLPHSL 54
```

Fig. 24

```
                                                              Smallest
                                                                Sum
                                                      High   Probability
Sequences producing High-scoring Segment Pairs:       Score  P(N)        N sequence 4_47_17_532                                   146   1.3e-18     1

>sequence 4_47_17_532
         Length = 80

Score = 146 (71.9 bits), Expect = 1.3e-18, P = 1.3e-18
 Identities = 32/74 (43%), Positives = 36/74 (48%)

Query:   1562 PPFPPFPPFPPPFPPFPMDDDDDDDPFPMQCCADLDLALADDLALQCLPHLPHHHLPFCAN 1621
              PPFPPFPPFPPPFPPFPM         P +     L   L +L+L  LPHLPH
Sbjct:      1 PPFPPFPPFPPPFPPFPMLLPLPHLPHLLPLQLQLPFCLLPELSLPHLPHLPHSLDALLLQ 60

Query:   1622 LLILLPFCLPFCLP 1635
                LP + LP
Sbjct:     61 AFCCLPHLILLILP 74
```

Fig. 25

```
                                                              Smallest
                                                                Sum
                                                    High   Probability
Sequences producing High-scoring Segment Pairs:    Score   P(N)         N sequence_FAKE_FakeFingerprint1                       28    0.86         1

>sequence_FAKE_FakeFingerprint1
        Length = 80

Score = 28 (16.1 bits), Expect = 2.0, P = 0.86
 Identities = 5/12 (41%), Positives = 8/12 (66%)

Query:   2545 AAAANANNANDL 2556
              AA   N+N  +D+
Sbjct:     16 AAMGNSNKMDDI 27
```

Fig. 26

```
                                                              Smallest
                                                                Sum
                                                    High   Probability
Sequences producing High-scoring Segment Pairs:    Score   P(N)         N sequence_FAKE_FakeFingerprint1                       31    0.79         1

>sequence_FAKE_FakeFingerprint1
        Length = 80

Score = 31 (17.5 bits), Expect = 1.6, P = 0.79
 Identities = 7/30 (23%), Positives = 13/30 (43%)

Query:   2527 ALQEFLELLPPEDLADLADLAANDLAPMDL 2556
              ++    + + P   + +  D   ND  P DL
Sbjct:     50 SIDHHFDEMMPAAMKNHIDPRGNDSGPCDL 79
```

Fig. 27

```
                                                        Smallest
                                                          Sum
                                               High    Probability
Sequences producing High-scoring Segment Pairs: Score    P(N)      N sequence_FAKE_FakeFingerprint1                    36     0.58      2

>sequence_FAKE_FakeFingerprint1
        Length = 80

Score = 36 (19.8 bits), Expect = 0.86, Sum P(2) = 0.58
 Identities = 7/28 (25%), Positives = 12/28 (42%)

Query:    599 LPHHLPHHLPHHLPHHDDDDDDDDDDDD 626
              +  HH    +P  + +H D   +D    D
Sbjct:     51 IDHHFDEMMPAAMKNHIDPRGNDSGPCD 78
```

*Fig. 28*

```
                                                        Smallest
                                                          Sum
                                               High    Probability
Sequences producing High-scoring Segment Pairs: Score    P(N)      N fp_E428_16_53_17_357         (Ranked 1st)        508    6.9e-69    1
...
sequence 4_47_17_532         (Ranked 25th)       460    5.8e-62    1
...
fp_E51_20_39_37_539          (Last, Ranked 96th)  42    0.94       1

>sequence 4_47_17_532
        Length = 80

Score = 460 (223.3 bits), Expect = 5.8e-62, P = 5.8e-62
Identities = 80/80 (100%), Positives = 80/80 (100%)

Query:   2002 PPFPPFPPFPPFPPFPFPMLLPLPHLPHLLPLQLQLPFCLLPELSLPHLPHLPHSLDALLLQ 2061
              PPFPPFPPFPPFPPFPFPMLLPLPHLPHLLPLQLQLPFCLLPELSLPHLPHLPHSLDALLLQ
Sbjct:      1 PPFPPFPPFPPFPPFPFPMLLPLPHLPHLLPLQLQLPFCLLPELSLPHLPHLPHSLDALLLQ 60

Query:   2062 AFCCLPHLILLILPHLPFCL 2081
              AFCCLPHLILLILPHLPFCL
Sbjct:     61 AFCCLPHLILLILPHLPFCL 80
```

*Fig. 29*

```
                                                          Smallest
                                                            Sum
                                               High    Probability
Sequences producing High-scoring Segment Pairs: Score   P(N)        N fp_E124_10_52_57_360           (Ranked 1st)     503    3.9e-68      1
...
sequence 4_47_17_532           (Ranked 34th)    194    1.6e-23      1
...
fp>E51_20_39_37_539            (Last, Ranked 95th)  41  0.98        1

>sequence 4_47_17_532
        Length = 80

Score = 194 (95.7 bits), Expect = 1.6e-23, P = 1.6e-23
 Identities = 35/38 (92%), Positives = 35/38 (92%)

Query:  1933 MLLPLPHLPHLLPLQLQLPFCLLPSPELPHLPHLPHSL 1970
             MLLPLPHLPHLLPLQLQLPFCLLP   LPHLPHLPHSL
Sbjct:    17 MLLPLPHLPHLLPLQLQLPFCLLPELSLPHLPHLPHSL 54
```

Fig. 30

```
                                                          Smallest
                                                            Sum
                                               High    Probability
Sequences producing High-scoring Segment Pairs: Score   P(N)        N fp_E425_14_27_55_30            (Ranked 1st)     653    7.0e-89      1
...
sequence 4_47_17_532           (Ranked 41st)    146    1.4e-16      1
...
fp_E121_14_59_3_127            (Last, Ranked 98th)  40  0.17        1

>sequence 4_47_17_532
        Length = 80

Score = 146 (71.9 bits), Expect = 1.4e-16, P = 1.4e-16
 Identities = 32/74 (43%), Positives = 36/74 (48%)

Query:  1562 PPFPPFPPFPPFPPFPMDDDDDDDFFPMQCCADLDLALADDLALQCLFHLPHHHLPFCAN 1621
             PPFPPFPPFPPFPPFPM         P  +    L   L  +L+L  LFHLPH
Sbjct:     1 PPFPPFPPFPPFPPFPMLLPLPHLFHLLPLQLQLFFCLLPELSLPHLFHLPHSLDALLLQ 60

Query:  1622 LLILLPFCLPFCLP 1635
             LP  + LP
Sbjct:    61 AFCCLPHLILLILF 74
```

Fig. 31

```
                                                              Smallest
                                                                Sum
                                                       High  Probability
Sequences producing High-scoring Segment Pairs:        Score  P(N)       N sequence_FAKE_FakeFingerprint1                          30   0.00032     1

>sequence_FAKE_FakeFingerprint1
        Length = 80

Score = 30 (30.9 bits), Expect = 0.00032, P = 0.00032
 Identities = 5/23 (21%), Positives = 10/23 (43%)

Query:  2565 LNANCANAAAANANNANAANANC 2587
             +N    +AA  + N  ++  C
Sbjct:     8 GNMHDMSDAAMGNSNKMDDILSC 30
```

Fig. 32

```
                                                              Smallest
                                                                Sum
                                                       High  Probability
Sequences producing High-scoring Segment Pairs:        Score  P(N)       N sequence_FAKE_FakeFingerprint1                          28   0.0012      1

>sequence_FAKE_FakeFingerprint1
        Length = 80

Score = 28 (29.0 bits), Expect = 0.0012, P = 0.0012
 Identities = 2/15 (13%), Positives = 8/15 (53%)

Query:  1898 SSLDLLIALPHLPHL 1912
             SS  + +  + ++  +
Sbjct:    33 SSKCSRSLGSLGRNI 47
```

Fig. 33

```
                                                            Smallest
                                                              Sum
                                                  High    Probability
Sequences producing High-scoring Segment Pairs:   Score     P(N)      N sequence_FAKE_FakeFingerprint1                     22       0.40      1

>sequence_FAKE_FakeFingerprint1
       Length = 80

Score = 22 (19.4 bits), Expect = 0.51, P = 0.40
 Identities = 1/8 (12%), Positives = 6/8 (75%)

Query:    745 ADLDLALN 752
              ++   +++N
Sbjct:     15 DAAMGNSN 22
```

Fig. 34

```
                                                            Smallest
                                                              Sum
                                                  High    Probability
Sequences producing High-scoring Segment Pairs:   Score     P(N)      N sequence 4_47_17_532           (Ranked 1st)        110     2.9e-25    1
...
fp_E50_20_16_45_485.fasta      (Last, 71st)         25      0.88      1

>sequence 4_47_17_532
       Length = 80

Score = 110 (107.0 bits), Expect = 2.9e-25, P = 2.9e-25
 Identities = 63/63 (100%), Positives = 22/63 (34%)

Query:   2018 MLLPLPHLPHLLPLQLQLPFCLLPELSLPHLPHLPHSLDALLLQAFCCLPHLILLILPHL 2077
              M    H    H    Q Q   C    E S  H  H  HS  A    QA CC   H I    I    H
Sbjct:     17 MLLPLPHLPHLLPLQLQLPFCLLPELSLPHLPHLPHSLDALLLQAFCCLPHLILLILPHL 76

Query:   2078 PFC 2080
               C
Sbjct:     77 PFC 79
```

Fig. 35

```
                                                          Smallest
                                                            Sum
                                                  High   Probability
Sequences producing High-scoring Segment Pairs:   Score    P(N)     N fp_E122_9_13_56_844          (Ranked 1st)          88    3.7e-19   1
...
sequence 4_47_17_532         (Ranked 15th)         59    2.9e-10   1
...
fp_E421_13_7_36_454          (Last, 75th)          24    0.98      1

>sequence 4_47_17_532
        Length = 80

Score = 59 (57.6 bits), Expect = 2.9e-10, P = 2.9e-10
 Identities = 34/37 (91%), Positives = 12/37 (32%)

Query:   1933  MLLPLPHLPHLLPLQLQLPFCLLPSPELPHLPHLPHS 1969
               M    H  H   Q Q    C  +  +  H   H  HS
Sbjct:     17  MLLPLPHLPHLLPLQLQLPFCLLPELSLPHLPHLPHS 53
```

Fig. 36

```
                                                          Smallest
                                                            Sum
                                                  High   Probability
Sequences producing High-scoring Segment Pairs:   Score    P(N)     N fp_E51_20_39_31_500          (Ranked 1st)          138   2.2e-26   1
fp_E51_20_39_35_506          (Ranked 2nd)          77    2.7e-18   2
...
fp_E52_20_16_20_910          (Last, 55th)          24    0.9998    1
...
sequence 4_47_17_532         (No Match)
```

Fig. 37

SEQUENCE LISTING

<160> NUMBER OF SEQ ID NOS: 47

<210> SEQ ID NO 1
<211> LENGTH: 7
<212> TYPE: PRT
<213> ORGANISM: Artificial
<220> FEATURE:
<223> OTHER INFORMATION: System call data

<400> SEQUENCE: 1

Met Leu Glu Asp Lys His Arg
1               5

<210> SEQ ID NO 2
<211> LENGTH: 8
<212> TYPE: PRT
<213> ORGANISM: Artificial
<220> FEATURE:
<223> OTHER INFORMATION: system call data

<400> SEQUENCE: 2

Ser Thr Arg Ala Ile Asn Glu Asp
1               5

<210> SEQ ID NO 3
<211> LENGTH: 5
<212> TYPE: PRT
<213> ORGANISM: Artificial
<220> FEATURE:
<223> OTHER INFORMATION: system call data

<400> SEQUENCE: 3

Asx Arg Ala Ile Asn
1               5

<210> SEQ ID NO 4
<211> LENGTH: 26
<212> TYPE: PRT
<213> ORGANISM: Artificial
<220> FEATURE:
<223> OTHER INFORMATION: system call data

```
<400> SEQUENCE: 4

Pro Ala Met Gly His Asp Glu Phe Pro Pro Phe Pro Pro Asp Glu His
1               5                   10                  15

Ile Lys Leu Asp Lys Lys Lys Gly His Ser
            20                  25

<210> SEQ ID NO 5
<211> LENGTH: 26
<212> TYPE: PRT
<213> ORGANISM: Artificial
<220> FEATURE:
<223> OTHER INFORMATION: System call data

<400> SEQUENCE: 5

Pro Ala Met Gly His Asp Glu Phe Pro Asp Phe Pro Pro Asp Glu His
1               5                   10                  15

Ile Lys Leu Asp Lys Lys Lys Gly His Ser
            20                  25

<210> SEQ ID NO 6
<211> LENGTH: 26
<212> TYPE: PRT
<213> ORGANISM: Artificial
<220> FEATURE:
<223> OTHER INFORMATION: system call data

<400> SEQUENCE: 6

Phe Ala Met Gly His Asp Glu Phe Pro Pro Phe Pro Pro Asp Glu His
1               5                   10                  15

Ile Lys Ser Phe Lys Lys Lys Gly His Ser
            20                  25

<210> SEQ ID NO 7
<211> LENGTH: 25
<212> TYPE: PRT
<213> ORGANISM: Artificial
<220> FEATURE:
<223> OTHER INFORMATION: system call data

<400> SEQUENCE: 7

Pro Glu Met Gly His Asp Glu Phe Pro Asp Phe Pro Pro Asp Glu His
1               5                   10                  15

Ile Lys Leu Asp Lys Lys Lys Gly His
            20                  25

<210> SEQ ID NO 8
<211> LENGTH: 24
<212> TYPE: PRT
<213> ORGANISM: Artificial
<220> FEATURE:
<223> OTHER INFORMATION: system call data

<400> SEQUENCE: 8

Pro Ala Met Gly His Asp Glu Phe Pro Pro Phe Pro Pro Asp Ile Lys
1               5                   10                  15

Leu Asp Lys Lys Lys Gly His Ser
            20

<210> SEQ ID NO 9
<211> LENGTH: 80
<212> TYPE: PRT
<213> ORGANISM: Artificial
<220> FEATURE:
<223> OTHER INFORMATION: system call data
```

<400> SEQUENCE: 9

Pro Pro Phe Pro Pro Phe Pro Pro Phe Pro Pro Phe Pro Pro Phe Pro
1               5                   10                  15

Met Leu Leu Pro Leu Pro His Leu Pro His Leu Leu Pro Leu Gln Leu
            20                  25                  30

Gln Leu Pro Phe Cys Leu Leu Pro Glu Leu Ser Leu Pro His Leu Pro
            35                  40                  45

His Leu Pro His Ser Leu Asp Ala Leu Leu Leu Gln Ala Phe Cys Cys
        50                  55                  60

Leu Pro His Leu Ile Leu Leu Ile Leu Pro His Leu Pro Phe Cys Leu
65                  70                  75                  80

<210> SEQ ID NO 10
<211> LENGTH: 60
<212> TYPE: PRT
<213> ORGANISM: Artificial
<220> FEATURE:
<223> OTHER INFORMATION: system call data

<400> SEQUENCE: 10

Met Leu Leu Pro Leu Pro His Leu Pro His Leu Leu Pro Leu Gln Leu
1               5                   10                  15

Gln Leu Pro Phe Cys Leu Leu Pro Glu Leu Ser Leu Pro His Leu Pro
            20                  25                  30

His Leu Pro His Ser Leu Asp Ala Leu Leu Leu Gln Ala Phe Cys Cys
            35                  40                  45

Leu Pro His Leu Ile Leu Leu Ile Leu Pro His Leu
        50                  55                  60

<210> SEQ ID NO 11
<211> LENGTH: 12
<212> TYPE: PRT
<213> ORGANISM: Artificial
<220> FEATURE:
<223> OTHER INFORMATION: system call data

<400> SEQUENCE: 11

His Leu Pro His Leu Pro His Leu Pro His Leu Ile
1               5                   10

<210> SEQ ID NO 12
<211> LENGTH: 12
<212> TYPE: PRT
<213> ORGANISM: Artificial
<220> FEATURE:
<223> OTHER INFORMATION: system call data

<400> SEQUENCE: 12

Ser Leu Pro His Leu Pro His Leu Pro His Ser Leu
1               5                   10

<210> SEQ ID NO 13
<211> LENGTH: 6
<212> TYPE: PRT
<213> ORGANISM: Artificial
<220> FEATURE:
<223> OTHER INFORMATION: system call data

<400> SEQUENCE: 13

Leu Pro Ser Ser Leu Asp
1               5

<210> SEQ ID NO 14
<211> LENGTH: 6
<212> TYPE: PRT
<213> ORGANISM: Artificial
<220> FEATURE:
<223> OTHER INFORMATION: system call data

<400> SEQUENCE: 14

Leu Pro His Leu Pro His
1               5

<210> SEQ ID NO 15
<211> LENGTH: 60
<212> TYPE: PRT
<213> ORGANISM: Artificial
<220> FEATURE:
<223> OTHER INFORMATION: system call data

<400> SEQUENCE: 15

Pro Pro Phe Pro Pro Phe Pro Pro Phe Pro Pro Phe Pro Pro Phe Pro
1               5                   10                  15

Met Leu Leu Pro Leu Pro His Leu Pro His Leu Leu Pro Leu Gln Leu
            20                  25                  30

Gln Leu Pro Phe Cys Leu Leu Pro Glu Leu Ser Leu Pro His Leu Pro
        35                  40                  45

His Leu Pro His Ser Leu Asp Ala Leu Leu Leu Gln
    50                  55                  60

<210> SEQ ID NO 16
<211> LENGTH: 20
<212> TYPE: PRT
<213> ORGANISM: Artificial
<220> FEATURE:
<223> OTHER INFORMATION: system call data

<400> SEQUENCE: 16

Ala Phe Cys Cys Leu Pro His Leu Ile Leu Leu Ile Leu Pro His Leu
1               5                   10                  15

Pro Phe Cys Leu
            20

<210> SEQ ID NO 17
<211> LENGTH: 38
<212> TYPE: PRT
<213> ORGANISM: Artificial
<220> FEATURE:
<223> OTHER INFORMATION: system call data

<400> SEQUENCE: 17

Met Leu Leu Pro Leu Pro His Leu Pro His Leu Leu Pro Leu Gln Leu
1               5                   10                  15

Gln Leu Pro Phe Cys Leu Leu Pro Ser Pro Glu Leu Pro His Leu Pro
            20                  25                  30

His Leu Pro His Ser Leu
        35

<210> SEQ ID NO 18
<211> LENGTH: 35
<212> TYPE: PRT
<213> ORGANISM: Artificial
<220> FEATURE:
<223> OTHER INFORMATION: system call data

<400> SEQUENCE: 18

```
Met Leu Leu Pro Leu Pro His Leu Pro His Leu Leu Pro Leu Gln Leu
1               5                   10                  15

Gln Leu Pro Phe Cys Leu Leu Pro Pro His Leu Pro His Leu Pro
            20                  25                  30

His Ser Leu
        35

<210> SEQ ID NO 19
<211> LENGTH: 38
<212> TYPE: PRT
<213> ORGANISM: Artificial
<220> FEATURE:
<223> OTHER INFORMATION: system call data

<400> SEQUENCE: 19

Met Leu Leu Pro Leu Pro His Leu Pro His Leu Leu Pro Leu Gln Leu
1               5                   10                  15

Gln Leu Pro Phe Cys Leu Leu Pro Glu Leu Ser Leu Pro His Leu Pro
            20                  25                  30

His Leu Pro His Ser Leu
        35

<210> SEQ ID NO 20
<211> LENGTH: 60
<212> TYPE: PRT
<213> ORGANISM: Artificial
<220> FEATURE:
<223> OTHER INFORMATION: system call data

<400> SEQUENCE: 20

Pro Pro Phe Pro Pro Phe Pro Pro Phe Pro Pro Phe Pro Pro Phe Pro
1               5                   10                  15

Met Asp Asp Asp Asp Asp Asp Pro Phe Pro Met Gln Cys Cys Ala
            20                  25                  30

Asp Leu Asp Leu Ala Leu Ala Asp Leu Ala Leu Gln Cys Leu Pro
        35                  40                  45

His Leu Pro His His His Leu Pro Phe Cys Ala Asn
    50                  55                  60

<210> SEQ ID NO 21
<211> LENGTH: 60
<212> TYPE: PRT
<213> ORGANISM: Artificial
<220> FEATURE:
<223> OTHER INFORMATION: system call data

<400> SEQUENCE: 21

Pro Pro Phe Pro Pro Phe Pro Pro Phe Pro Pro Phe Pro Pro Phe Pro
1               5                   10                  15

Met Leu Leu Pro Leu Pro His Leu Pro His Leu Leu Pro Leu Gln Leu
            20                  25                  30

Gln Leu Pro Phe Cys Leu Leu Pro Glu Leu Ser Leu Pro His Leu Pro
        35                  40                  45

His Leu Pro His Ser Leu Asp Ala Leu Leu Leu Gln
    50                  55                  60

<210> SEQ ID NO 22
<211> LENGTH: 14
<212> TYPE: PRT
<213> ORGANISM: Artificial
<220> FEATURE:
```

```
<223> OTHER INFORMATION: system call data

<400> SEQUENCE: 22

Leu Leu Ile Leu Leu Pro Phe Cys Leu Pro Phe Cys Leu Pro
1               5                   10

<210> SEQ ID NO 23
<211> LENGTH: 14
<212> TYPE: PRT
<213> ORGANISM: Artificial
<220> FEATURE:
<223> OTHER INFORMATION: system call data

<400> SEQUENCE: 23

Ala Phe Cys Cys Leu Pro His Leu Ile Leu Leu Ile Leu Pro
1               5                   10

<210> SEQ ID NO 24
<211> LENGTH: 12
<212> TYPE: PRT
<213> ORGANISM: Artificial
<220> FEATURE:
<223> OTHER INFORMATION: system call data

<400> SEQUENCE: 24

Ala Ala Ala Ala Asn Ala Asn Asn Ala Asn Asp Leu
1               5                   10

<210> SEQ ID NO 25
<211> LENGTH: 12
<212> TYPE: PRT
<213> ORGANISM: Artificial
<220> FEATURE:
<223> OTHER INFORMATION: system call data

<400> SEQUENCE: 25

Ala Ala Met Gly Asn Ser Asn Lys Met Asp Asp Ile
1               5                   10

<210> SEQ ID NO 26
<211> LENGTH: 30
<212> TYPE: PRT
<213> ORGANISM: Artificial
<220> FEATURE:
<223> OTHER INFORMATION: system call data

<400> SEQUENCE: 26

Ala Leu Gln Glu Phe Leu Glu Leu Leu Pro Pro Glu Asp Leu Ala Asp
1               5                   10                  15

Leu Ala Asp Leu Ala Ala Asn Asp Leu Ala Pro Met Asp Leu
            20                  25                  30

<210> SEQ ID NO 27
<211> LENGTH: 30
<212> TYPE: PRT
<213> ORGANISM: Artificial
<220> FEATURE:
<223> OTHER INFORMATION: system call data

<400> SEQUENCE: 27

Ser Ile Asp His His Phe Asp Glu Met Met Pro Ala Ala Met Lys Asn
1               5                   10                  15

His Ile Asp Pro Arg Gly Asn Asp Ser Gly Pro Cys Asp Leu
            20                  25                  30
```

-continued

```
<210> SEQ ID NO 28
<211> LENGTH: 28
<212> TYPE: PRT
<213> ORGANISM: Artificial
<220> FEATURE:
<223> OTHER INFORMATION: system call data

<400> SEQUENCE: 28

Leu Pro His His Leu Pro His His Leu Pro His His Leu Pro His His
1               5                   10                  15

Asp Asp Asp Asp Asp Asp Asp Asp Asp Asp Asp Asp
            20                  25

<210> SEQ ID NO 29
<211> LENGTH: 28
<212> TYPE: PRT
<213> ORGANISM: Artificial
<220> FEATURE:
<223> OTHER INFORMATION: system call data

<400> SEQUENCE: 29

Ile Asp His His Phe Asp Glu Met Met Pro Ala Ala Met Lys Asn His
1               5                   10                  15

Ile Asp Pro Arg Gly Asn Asp Ser Gly Pro Cys Asp
            20                  25

<210> SEQ ID NO 30
<211> LENGTH: 60
<212> TYPE: PRT
<213> ORGANISM: Artificial
<220> FEATURE:
<223> OTHER INFORMATION: system call data

<400> SEQUENCE: 30

Pro Pro Phe Pro Pro Phe Pro Pro Phe Pro Pro Phe Pro Pro Phe Pro
1               5                   10                  15

Met Leu Leu Pro Leu Pro His Leu Pro His Leu Leu Pro Leu Gln Leu
            20                  25                  30

Gln Leu Pro Phe Cys Leu Leu Pro Glu Leu Ser Leu Pro His Leu Pro
        35                  40                  45

His Leu Pro His Ser Leu Asp Ala Leu Leu Leu Gln
    50                  55                  60

<210> SEQ ID NO 31
<211> LENGTH: 20
<212> TYPE: PRT
<213> ORGANISM: Artificial
<220> FEATURE:
<223> OTHER INFORMATION: system call data

<400> SEQUENCE: 31

Ala Phe Cys Cys Leu Pro His Leu Ile Leu Leu Ile Leu Pro His Leu
1               5                   10                  15

Pro Phe Cys Leu
            20

<210> SEQ ID NO 32
<211> LENGTH: 38
<212> TYPE: PRT
<213> ORGANISM: Artificial
<220> FEATURE:
<223> OTHER INFORMATION: system call data

<400> SEQUENCE: 32
```

Met Leu Leu Pro Leu Pro His Leu Pro His Leu Leu Pro Leu Gln Leu
1               5                   10                  15

Gln Leu Pro Phe Cys Leu Leu Pro Ser Pro Glu Leu Pro His Leu Pro
            20                  25                  30

His Leu Pro His Ser Leu
            35

<210> SEQ ID NO 33
<211> LENGTH: 35
<212> TYPE: PRT
<213> ORGANISM: Artificial
<220> FEATURE:
<223> OTHER INFORMATION: system call data

<400> SEQUENCE: 33

Met Leu Leu Pro Leu Pro His Leu Pro His Leu Leu Pro Leu Gln Leu
1               5                   10                  15

Gln Leu Pro Phe Cys Leu Leu Pro Leu Pro His Leu Pro His Leu Pro
            20                  25                  30

His Ser Leu
       35

<210> SEQ ID NO 34
<211> LENGTH: 38
<212> TYPE: PRT
<213> ORGANISM: Artificial
<220> FEATURE:
<223> OTHER INFORMATION: system call data

<400> SEQUENCE: 34

Met Leu Leu Pro Leu Pro His Leu Pro His Leu Leu Pro Leu Gln Leu
1               5                   10                  15

Gln Leu Pro Phe Cys Leu Leu Pro Glu Leu Ser Leu Pro His Leu Pro
            20                  25                  30

His Leu Pro His Ser Leu
            35

<210> SEQ ID NO 35
<211> LENGTH: 60
<212> TYPE: PRT
<213> ORGANISM: Artificial
<220> FEATURE:
<223> OTHER INFORMATION: system call data

<400> SEQUENCE: 35

Pro Pro Phe Pro Pro Phe Pro Pro Phe Pro Pro Phe Pro Pro Phe Pro
1               5                   10                  15

Met Asp Asp Asp Asp Asp Asp Pro Phe Pro Met Gln Cys Cys Ala
            20                  25                  30

Asp Leu Asp Leu Ala Leu Ala Asp Leu Ala Leu Gln Cys Leu Pro
        35                  40                  45

His Leu Pro His His His Leu Pro Phe Cys Ala Asn
        50                  55                  60

<210> SEQ ID NO 36
<211> LENGTH: 60
<212> TYPE: PRT
<213> ORGANISM: Artificial
<220> FEATURE:
<223> OTHER INFORMATION: system call data

<400> SEQUENCE: 36

```
Pro Pro Phe Pro Pro Phe Pro Pro Phe Pro Pro Phe Pro Pro Phe Pro
1               5                   10                  15

Met Leu Leu Pro Leu Pro His Leu Pro His Leu Leu Pro Leu Gln Leu
            20                  25                  30

Gln Leu Pro Phe Cys Leu Leu Pro Glu Leu Ser Leu Pro His Leu Pro
            35                  40                  45

His Leu Pro His Ser Leu Asp Ala Leu Leu Leu Gln
            50                  55                  60

<210> SEQ ID NO 37
<211> LENGTH: 14
<212> TYPE: PRT
<213> ORGANISM: Artificial
<220> FEATURE:
<223> OTHER INFORMATION: system call data

<400> SEQUENCE: 37

Leu Leu Ile Leu Leu Pro Phe Cys Leu Pro Phe Cys Leu Pro
1               5                   10

<210> SEQ ID NO 38
<211> LENGTH: 14
<212> TYPE: PRT
<213> ORGANISM: Artificial
<220> FEATURE:
<223> OTHER INFORMATION: system call data

<400> SEQUENCE: 38

Ala Phe Cys Cys Leu Pro His Leu Ile Leu Leu Ile Leu Pro
1               5                   10

<210> SEQ ID NO 39
<211> LENGTH: 23
<212> TYPE: PRT
<213> ORGANISM: Artificial
<220> FEATURE:
<223> OTHER INFORMATION: system call data

<400> SEQUENCE: 39

Leu Asn Ala Asn Cys Ala Asn Ala Ala Ala Ala Asn Ala Asn Asn Ala
1               5                   10                  15

Asn Ala Ala Asn Ala Asn Cys
            20

<210> SEQ ID NO 40
<211> LENGTH: 23
<212> TYPE: PRT
<213> ORGANISM: Artificial
<220> FEATURE:
<223> OTHER INFORMATION: system call data

<400> SEQUENCE: 40

Gly Asn Met His Asp Met Ser Asp Ala Ala Met Gly Asn Ser Asn Lys
1               5                   10                  15

Met Asp Asp Ile Leu Ser Cys
            20

<210> SEQ ID NO 41
<211> LENGTH: 15
<212> TYPE: PRT
<213> ORGANISM: Artificial
<220> FEATURE:
<223> OTHER INFORMATION: system call data

<400> SEQUENCE: 41
```

```
Ser Ser Leu Asp Leu Leu Ala Leu Pro His Leu Pro His Leu
1               5                   10                  15

<210> SEQ ID NO 42
<211> LENGTH: 15
<212> TYPE: PRT
<213> ORGANISM: Artificial
<220> FEATURE:
<223> OTHER INFORMATION: system call data

<400> SEQUENCE: 42

Ser Ser Lys Cys Ser Arg Ser Leu Gly Ser Leu Gly Arg Asn Ile
1               5                   10                  15

<210> SEQ ID NO 43
<211> LENGTH: 8
<212> TYPE: PRT
<213> ORGANISM: Artificial
<220> FEATURE:
<223> OTHER INFORMATION: system call data

<400> SEQUENCE: 43

Ala Asp Leu Asp Leu Ala Leu Asn
1               5

<210> SEQ ID NO 44
<211> LENGTH: 8
<212> TYPE: PRT
<213> ORGANISM: Artificial
<220> FEATURE:
<223> OTHER INFORMATION: system call data

<400> SEQUENCE: 44

Asp Ala Ala Met Gly Asn Ser Asn
1               5

<210> SEQ ID NO 45
<211> LENGTH: 60
<212> TYPE: PRT
<213> ORGANISM: Artificial
<220> FEATURE:
<223> OTHER INFORMATION: system call data

<400> SEQUENCE: 45

Met Leu Leu Pro Leu Pro His Leu Pro His Leu Pro Leu Gln Leu
1               5                   10                  15

Gln Leu Pro Phe Cys Leu Leu Pro Glu Leu Ser Leu Pro His Leu Pro
                20                  25                  30

His Leu Pro His Ser Leu Asp Ala Leu Leu Leu Gln Ala Phe Cys Cys
            35                  40                  45

Leu Pro His Leu Ile Leu Leu Ile Leu Pro His Leu
        50                  55                  60

<210> SEQ ID NO 46
<211> LENGTH: 37
<212> TYPE: PRT
<213> ORGANISM: Artificial
<220> FEATURE:
<223> OTHER INFORMATION: system call data

<400> SEQUENCE: 46

Met Leu Leu Pro Leu Pro His Leu Pro His Leu Leu Pro Leu Gln Leu
1               5                   10                  15

Gln Leu Pro Phe Cys Leu Leu Pro Ser Pro Glu Leu Pro His Leu Pro
```

```
                    20                  25                  30
His Leu Pro His Ser
                35

<210> SEQ ID NO 47
<211> LENGTH: 37
<212> TYPE: PRT
<213> ORGANISM: Artificial
<220> FEATURE:
<223> OTHER INFORMATION: system call data

<400> SEQUENCE: 47

Met Leu Leu Pro Leu Pro His Leu Pro His Leu Leu Pro Leu Gln Leu
1               5                   10                  15

Gln Leu Pro Phe Cys Leu Leu Pro Glu Leu Ser Leu Pro His Leu Pro
                20                  25                  30

His Leu Pro His Ser
                35
```

DIGITAL FORENSICS

CROSS-REFERENCE TO RELATED APPLICATIONS

This application is a national-stage filing of International Patent Application PCT/GB2009/051142, filed on Sep. 9, 2009. International Patent Application PCT/GB2009/051142 claims priority from U.S. Provisional Patent Application No. 61/116,681, filed on Nov. 21, 2008. U.S. Provisional Patent Application No. 61/116,681 is incorporated herein by reference.

The present disclosure relates to improvements in or relating to digital forensics, and in particular to new methods and apparatus for digital forensic analysis of digital computing systems.

Locard's Exchange Principle best describes the fundamental theory of Forensic Science; that it is impossible to commit a crime without leaving a trace. Due to this interchange, it is possible for this evidence to be collected and analysed to establish the cause of an incident. The discipline of forensic science relates specifically to a scientific methodology to collect, preserve and analyse this information.

Forensic science has been developing ever since the late 18th Century, when the original forensic scientists practiced medicine, usually in order to analyse the cause of disease, by performing autopsies. The use of forensic analysis for criminal investigations was derived from this medical background, due to the teaching of thorough, evidence-based reasoning, leading to the development of fingerprint evidence as well as contemporary specialisations that have evolved, such as ballistics, DNA analysis, toxicology, and so on.

Although digital computing devices and systems process and store virtual, not physical material, Locard's principle still applies. The discipline of digital forensics is well established, and is starting to diverge into specialties. The term "digital forensics" is understood herein to refer to investigative or analytical activity relating to any digital computing system ("DCS"), where a DCS is any device that manipulates, stores or otherwise processes digital information. For example, computers of all types, mobile telephones, personal digital assistants (PDA's), media players, set-top boxes, games consoles, televisions, and all associated network components such as routers, switches, hubs, servers, and broadcast equipment, are encompassed by the term DCS. This list is not exhaustive and is provided for purposes of illustration only.

In the early days of digital forensics, the methodologies that were used in traditional forensics fields were directly applicable. The evidence gathered from computer systems were generally indicative of tangible crimes committed outside of the computer environment. Computers themselves were rarely the target for criminal activity, but instead were used to store evidence relating to crimes, such as fraud. However with the increasing importance and popularity of computers, IT systems themselves are, increasingly, the target of criminal activity. It is now possible for crimes to be committed in virtual domains, with electronic and logical trails of evidence relating to events that only occurred in an abstract, or technical sense. With the increasing sophistication of those individuals capable of breaking into a computer system (intruders), and the ubiquity of high value data stored on digital systems, those tasked with investigating these crimes adopted investigative techniques identical to those they were tracking. Whereas the ballistics expert or fingerprint analyst possess skill sets different from the individuals who committed the crimes, those working with networked systems have to learn and adopt skills identical to those of the individuals being investigated.

Internetworked systems are not the only technology being abused by criminals, or implicated in criminal activities. PDA's, phones and digital cameras can all contain vital clues as to the circumstances surrounding a crime. With the continued convergence of technologies, the number and variation of devices will merge and expand into new and even more sophisticated equipment. For example, the convergence of the digital camera and mobile phone leads to interesting trails of evidence. These changes and re-definitions of a computing device occur frequently, and rapidly. The almost limitless configuration of devices capable of storing and processing digital information, results in an ecosystem of variant devices, with differing levels of openness, methods of interaction, and so on. This poses a significant challenge for the computer forensic investigator, who must keep their skill-set updated and relevant. This has been addressed, in part, by the obvious need of sub-disciplines within this domain. These can be referred to as Computer Forensics, PDA Forensics, Network Forensics, and so on. The term "Digital Forensics" (DF) encompasses all of these particular sub-disciplines. While various bodies have attempted to offer formal definitions of the field of digital forensics, the term as used in this description has a slightly broader meaning as discussed above, because as will be apparent the teaching of this disclosure can be applied to any investigative or analytical activity relating to any DCS.

The problems facing DF do not solely relate to the variance within DCS. Different domains require distinctive outcomes from an DF investigation. Broadly, these domains can be defined as: civilian; and organisational. The civilian context normally involves law enforcement agencies investigating individual(s) with the intent of solving or prosecuting an alleged crime. The distinction between these two domains is the manner in which crime is detected, reported, and controlled. Within the civilian context, crimes are reported to, and therefore investigated by law enforcement agencies. Within the organisational context, a crime can constitute a number of different types of digression, all of which have differing levels of severity. A circumvention of an IT usage policy would be a transgression against the organisation. Depending on the policy circumvention, it may also break various laws. If this is the case, the organisation may seek prosecution, which means the necessary law enforcement groups would be contacted. Yet, the organisation may chose to deal with the policy circumvention itself, as it may have the necessary technical and operational expertise to conduct such an investigation in-house, or possibly because of the sensitive nature of the operations or incident that occurred.

A DF investigation may be carried out in a variety of circumstances. Temporal aspects of the investigation can be the determining factor. The traditional view is of the post-event analysis of a computer-related crime. This may be the analysis of records left on a computer system that has been used in connection with a criminal offence, for example, the examination of a computer system that contains documents relating to a drugs offence. With the rise of more technologically sophisticated crimes, it may be the case that digital forensic techniques are deployed during the time in which a crime is being committed. As a consequence, the tools and procedures during an investigation differ, along with the reasons for launching an investigation, and the desired outcome of an investigation, for example the primary objective of a law enforcement operative is to successfully prosecute the criminal and the forensic activity is usually carried out after the event of a crime, while the primary objective of a military outfit would be to maintain continuity of operations and the forensic activity may carried out during the performance of a crime.

The methodology employed to investigate an incident will depend on a number of factors, some of which have just been highlighted. One of the principle concerns of the security domain is with intrusion detection, that is, prevention mechanisms and detection techniques for preventing unauthorised access to data. The security domain classically employs a model of policy circumvention which can broadly be defined as: 1. Reconnaissance; 2. Foot-printing; 3. Enumeration; 4. Probing for weaknesses; 5. Penetration; 6. Gaining the objective; 7. Clean-up.

However, within the DF domain, unlike that of security, these steps do not offer the entire framework. The methodological context and investigative model for a security domain are not always applicable to the DF domain.

The following example illustrates how, in particular, policy context influences how different systems would view an event where users A and B are users on a computer network. A logs in from a given node, N, to run the program EXAMPLE to access B's customer record.

Detection of Attack: Is the program EXAMPLE an attack tool? Are the actions taken by the user A part of an Attack?

Detection of Intrusion: Is the user A really logged in? Does A normally log in from node N at this time? Does A normally run program EXAMPLE to access B's customer record? Is A allowed to do so?

Detection of Misuse: Is A supposed to be running program EXAMPLE? Is A supposed to be accessing B's customer record? Has A run other programs that make running EXAMPLE a policy violation? Has A accessed other records that make accessing B's records a policy violation?

Analysis: What is happening on the system? Where is node N? Who is using the account called "A" and where is that user located? What program is being called by the name EXAMPLE? What part of the database is being accessed by the label "B's customer record" and where is it being stored? What changes happen as a result of this action?

Thus, it can be seen that the goal of an investigation is coloured by a particular context. The same is true for DF.

Accordingly, the investigative model for DF differs in some respects from that of the security domain. The DF investigative model borrows from fundamental forensic science models, but also incorporates domain specific knowledge.

The manner in which an investigation proceeds is normally modelled, or predefined, in order to ensure the investigator fulfils core investigative procedures, as well as the different considerations that must be made in each set of circumstances. Context should be considered, and can be important at various different stages of the investigation. As we will see, there are a number of different factors that must be considered, as they will have a fundamental impact on the investigation and its outcomes. A good model of investigation can provide a basis for common technology, aid implementation and testing of new technology, and provide a common basis for technology and information sharing. The fundamental methodology used in digital forensics is the same as used in forensic science, comprising the following stages:

Acquisition—Obtain the data from the device(s) under investigation. The quantity of information gathered will vary depending on the size of disk analysed or the size of distributed system under investigation.

Analysis—Construct a hypothesis about the events leading up to and after the incident. Use the evidence collected from the environment in order to confirm or refute the original hypothesis. Construct a new hypothesis as necessary and reiterate the process.

Presentation—The findings of the investigation will be written up and presented in a manner that is easy to understand, explaining, with reference to the evidence collected, the conclusions. All abstracted terminology should be explained in detail.

The evidence collected during an investigation must be handled in an appropriate manner, as it is this material that will be used to prove, or disprove a hypothesis constructed and can be inculpatory or exculpatory.

Due to the ad-hoc nature in which digital forensics has evolved, a wide array of guidelines have been published by law enforcement agencies, governments, system administrators and even system intruders. There are various inconsistencies between and deficiencies with these models. However, the stages of a DF investigation will generally include the following:

1. Preparation—This stage involves implementing and establishing proper audit and controls in order to detect an incident. This will be defined in a policy, agreed upon by management, which takes into consideration legal aspects and the goals of the organisation in question. In addition, this phase consists of collecting the appropriate tools, establishing techniques and training personnel to use these tools and techniques.

2. Incident Response—This stage consists of identifying an incident from the auditing systems, or any other indications available. This phase will consist of establishing the extent of the intrusion, and preparing a response according the goals of the organisation.

3. Data Collection—At this stage, data should be preserved, if possible, from contamination. All necessary information from both the physical and logical crime scene should be recorded using standardized and accepted procedures.

4. Data Analysis—Construct a hypothesis about the events leading up to and after the incident. Use the evidence collected from the environment in order to confirm or refute the original hypothesis. Construct a new hypothesis as necessary and reiterate the process.

5. Presentation of Findings—Findings of the investigation will be written up and presented in a manner that is easy to understand, explaining, with reference to the evidence collected, the conclusions. All abstracted terminology should be explained in detail.

6. Incident Closure—Depending on the findings or intent of the investigation, criminal proceedings may be initiated, disciplinary hearings may be conducted, or a review of IT policy may be undertaken.

Another key aspect of a DF investigation is the nature of the data itself. Every DCS creates, stores or manipulates digital information which form the basis of digital evidence. DCS's create a diverse range of data other than those familiar to an everyday unskilled end user. For every text document created and saved to a hard disk, or for every data packet routed from one end of the Internet to the other, a voluminous amount of data relating to each activity is created, manipulated and discarded. Some of this information is useful, and can be used in a variety of ways, from debugging an application, to signalling that various equipment or applications are working in a correct manner. Indeed, some of this record keeping by digital computing systems is desired as it allows the operators to gather situational awareness, which generally comes in the form of a log file or audit event. Low-level system events, as well as application-specific events, all generate records by the use of various event logging mechanisms provided by the relevant Operating System (OS), or in a bespoke manner by the application itself. This situational awareness can provide the system administrator with enough information to understand when a particular user has logged in, or for the software engineer to have an indication of the last error message a piece of software generated.

All data produced by a system is regarded by the DF investigator as possible evidence. The terms "data" and "digital evidence" will henceforth be used interchangeably. The potential richness of this pool of data can be limited by, or even diluted, by the type of data that gets logged, and which particular software system logs it. Depending on context and intent, the scarcity, or over-abundance of data can be either be beneficial, detrimental, or both. Because the digital evidence used for an investigation can originate from many different sources, and not just the output of a security monitoring system, we will define the general term Logging Entity (LE) which will be used to cover all forms of digital collection and logging apparatus.

Data gathered has a number of characteristics which need to be taken into account when designing a DF methodology and system.

Firstly, data can be viewed at different levels of abstraction. This is also known as the complexity problem. At the lowest form, data is generally incomprehensible to humans, as it is a series of one's and zero's. It takes a great deal of skill to view data in this manner, and although not impossible, is not an efficient or a desirable form of analysis. The operating system or application will generally translate this form of data into a human-readable format.

One of the best examples of the complexity problem can be outlined using HTML. HTML is a mark-up language that defines the layout and look of a Web page. At its lowest representation, it is a collection of one's and zero's. When opened in an HTML editor, it appears as a series of tags. Although not unreadable, it is difficult for the human analyst to make sense of this information, as, for example, images will merely be represented by links to image locations on a storage medium, and layout will be represented by encoding that is not intuitive. When HTML is open using a Web browser, it will be interpreted and rendered into a form that is readable by humans, including all images, text and appropriate layout.

Data also requires interpretation (this is also part of the complexity principle). An analyst requires tools or software to render data in a manner that is in a human readable format. This introduces a number of problems which relate to the translation of data from one layer of abstraction to another. If the tool being used mistranslates the data, then such an error may misrepresent the original meaning or the reality the data conveys.

Data is also characteristically fragile. It is easy to alter as it is highly malleable, thus it is prone to change by accident or through intent. This is why there is a great deal of focus on how data is handled by the investigator, ensuring provenance throughout all stages of an investigation.

Due to the fragility of digital evidence, practice guidelines need to be adhered to help maintain the integrity of data collected and maintain a coherent and verifiable chain of evidence. Considerations include steps to ensure that no action taken by a law officer changes data on a DCS under investigation unless they have the relevant competencies, and then if any changes are made, an audit trail or record must be created and preserved, with the overall person responsible for the investigation also being specifically responsible for ensuring that these principles are adhered to.

A further characteristic of data is the sheer volume that is generated, which raises issues of storage and filtering for effective analysis. With a large increase in data production per-person, and a large amount of this data being stored on magnetic media, with hard disks being the most popular form, it can be stated that there is more and more information being produced. Combined with a rapid increase in internet users, the amount of data being transmitted and therefore subject to existing auditing and logging infrastructure will grow. Hard disk size grows year-on-year, making the proposition of analysing every single file on a single PC, never mind those belonging to a large organisation, a daunting task which is expensive in terms of time and resources.

Data is also difficult to associate with reality. Some of the most difficult aspects of attempting a prosecution of an individual have related to proving that the individual was in operation of the machine at the time the alleged crime took place. Along with the ease of computer automation, and the problems that malware cause, it can be difficult to attribute blame easily to an individual. For this purpose it is the use of physical (cameras, and door entry logs) and digital (computer usage logs, file traces) artefacts in combination that provides the most compelling evidence, although improved digital methods in themselves would be useful.

Data collected also needs to be evaluated against the relevant fitness criteria. For example to be suitable for use as evidence in a court of law, the data must be shown to be complete, accurate and authentic.

Accordingly there is a need for improved DF techniques that can address one or more of these problems with data and that is preferably compatible with accepted principles of DF methodology and/or can cope with different investigative contexts.

According to a first aspect of the present invention there is provided a digital forensic analysis method comprising the steps of:

collecting system call data from a digital computing system (DCS);
converting the system call data to a sequence format;
selecting from a system call sequence database a test sequence of system calls; and
performing a sequence matching step to detect matches between the test sequence of system calls and the system call data collected from the DCS.

A "sequence matching step" is performed by a sequence matching algorithm, which can be any pattern matching, pattern recognition, or sequence alignment algorithm. A "sequence format" is any data format suitable for use with a sequence matching algorithm.

Optionally, the sequence format represents one system call as a sequence element and the sequence is a string of the sequence elements. The sequence elements are optionally alphanumeric characters, preferably letters of the Roman alphabet.

Optionally, the sequence matching step comprises the use of a biological sequence matching algorithm.

A "biological sequence matching algorithm" is taken to be any sequence matching algorithm that is known for use in the fields of protein or DNA sequence matching. The term also extends to modified versions or adaptations of these biological sequence matching algorithms.

Optionally, said biological sequence matching algorithm uses Karlin-Altschul statistics as a basis for determining sequence alignment.

Optionally, the method further comprises frequency domain analysis of system call data. This analysis can be carried out either before or after the step of converting the system call data to a sequence format.

Optionally, the frequency domain analysis comprises assigning a value as an amplitude to each system call.

Optionally, the frequency domain analysis comprises constructing a signal on the basis of the number of occurrences of individual alphabets per unit time in the sequence of system calls.

Optionally, an entry in the system call sequence database is constructed by:
- running a test scenario on the DCS and collecting system call data generated by the test scenario;
- converting said system call data to a sequence format; and
- recording a sequence of system calls as a database entry corresponding to the test scenario.

The "sequence of system calls" thus recorded is referred to as a "fingerprint" in the following description.

Optionally, said database is unique to a given DCS.

Optionally, said system call data is collected at the interface between kernel and user space of the DCS, most preferably by a software wrapper that intercepts all system calls made between said kernel and user space.

Optionally, the method further comprises the step of emulating a user interface, and using the sequence of system calls to recreate graphically user actions on an emulated graphical user interface.

Optionally said emulator reads ahead of a displayed time slice and compiles the data; and then subsequently displays the simulated user experience in the order as input by a user of the DCS.

Optionally, one or more of the steps carried out following collection of data from a DUT are carried out at a location remote from the DUT and/or remote from a DUT host organisation.

According to a second aspect of the present invention there is provided a digital forensic system comprising:
- data collection means for collecting system call data from a digital computing system (DCS);
- data formatting means arranged to convert the collected system call data to a sequence format; and
- sequence matching means arranged to detect a match between said collected system call data and a test sequence of system calls.

Optionally, said system comprises an evidence generation means arranged to run a test scenario on the DCS, collect system call data generated by said test scenario, convert the collected system call data to a sequence format, and record said system call data in a system call sequence database.

Optionally, the means by which the evidence generation converts the collected system call data to a sequence format can be the same data formatting means as used to convert the system call data from the DCS.

Optionally, the data collection means is provided at the interface between kernel and user space of the DCS, most preferably being provided as a software wrapper that is arranged to intercept all system calls made between said kernel and user space.

Optionally, the system comprises a performance monitoring means which is arranged to operate the evidence generation means Optionally, said sequence matching means comprises biological sequence matching means.

Optionally, said biological sequence matching means comprises a component that uses Karlin-Altschul statistics as a basis for determining sequence alignment.

Optionally, said system further comprises an emulation means arranged to simulate a graphical user interface, to receive an input sequence of system call data and to display a graphical recreation of user activity based on said input sequence of system call data.

Optionally, said emulation means further comprises a compiler arranged to compile a portion of the sequence of system call data that is ahead of a displayed time slice; and processor means to interpret the compiled data and to display the simulated user experience in the order as input by a user of the DCS.

Optionally, components of the digital forensic system are distributed, with at least said data formatting means and said sequence matching means being at a location remote from the DUT and/or remote from a DUT host organisation.

Optionally, the components are distributed in a service-oriented architecture (SOA).

According to a third aspect of the present invention there is provided a system call sequence database comprising as entries system call sequences generated from running test scenarios on a DCS.

According to further aspects there are provided computer programs and computer program products for implementation of the preceding aspects, which can be recorded on a computer storage medium including as a signal, or made available for download or other types of transmission.

The present invention will now be described, by way of example only, with reference to the accompanying drawings, in which:

FIG. 3 illustrates a matrix initialisation phase of a global sequence alignment method;

FIG. 4 illustrates a matrix fill phase of a global sequence alignment method;

FIG. 5 illustrates a matrix trace back phase of a global sequence alignment method;

FIG. 6 illustrates a matrix for a local sequence alignment method;

FIG. 17 illustrates an example match section from a sequence matching algorithm match report;

FIG. 18 illustrates a search space for demonstrating the alignment between sequences. Each point on the diagram represents a pairing of letters from each sequence;

FIG. 21 illustrates a key of the system calls shown in FIGS. 19 and 20;

FIG. 22 illustrates the differences in empirical analysis, between a time-based proximity method that indicates pattern scoring and a generation-based substitution method that indicates biological-style evolution; and FIGS. 23-37 illustrate match results taken from match reports of various experiments demonstrating the efficacy of a sequence matching technique for various use case scenarios.

Figure 1:
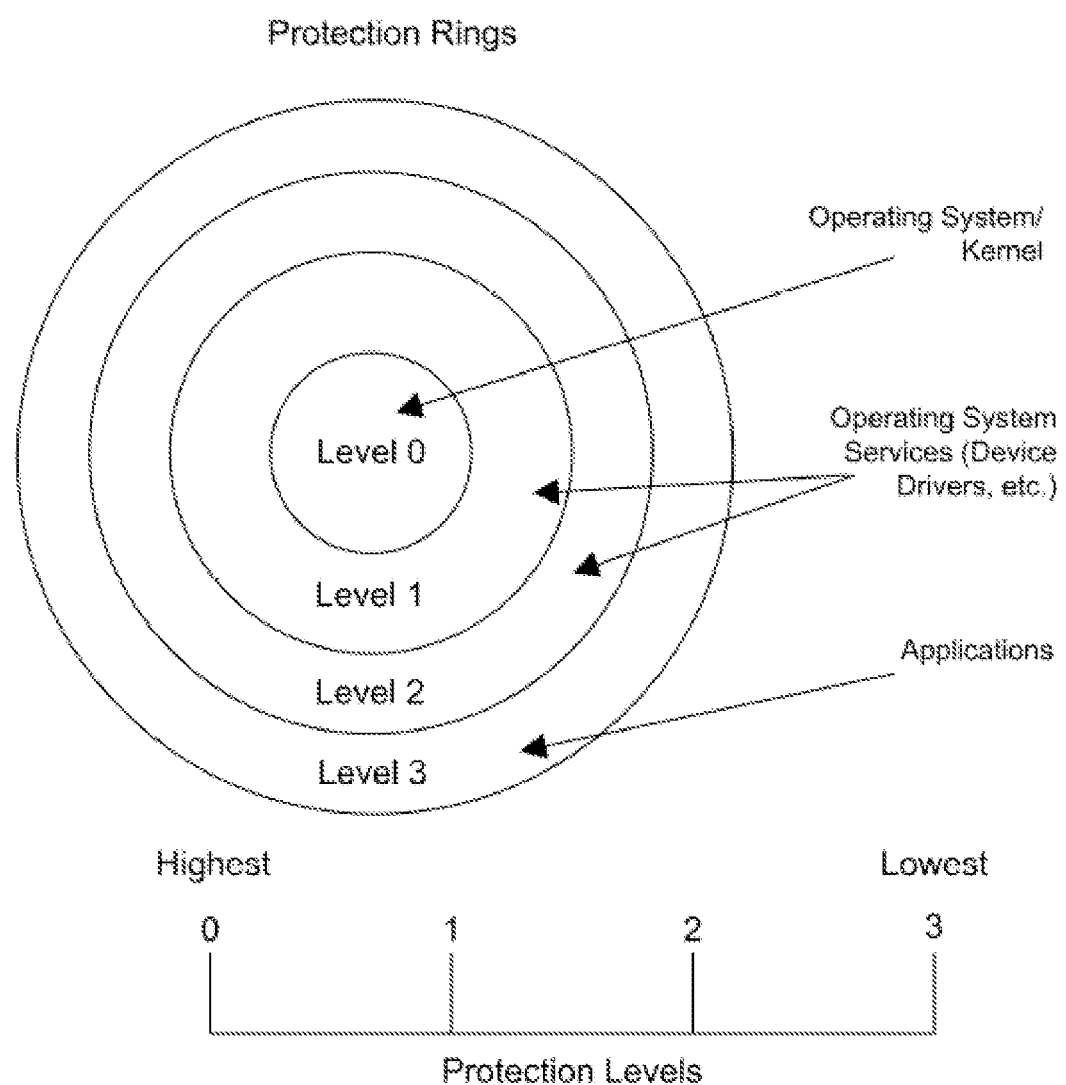
FIG. 1 illustrates the layers of an x86 architecture Operating System.

The text of the drawings forms part of the disclosure and is incorporated herein by reference.

Data found on a system is either associated with an automated process (syslog, event logs, Intrusion Detection System (IDS), etc.) or associated with the intentional actions of a human (a saved file, a viewed picture, a moved document, and so on). The data collected by a DF process can be categorized as being either raw or interpreted. Interpreted data poses a problem as it involves the translation of data as it passes through a number of different layers before ending up in its final state. The nature of the translations and even in some cases the layers themselves are often undocumented or out of the control of the DF investigator.

Most of the data collected by a DF investigation can be considered to be of the translated variety, as it resides in logs, or in files on the hard disk. These types of data have passed through at least one layer of software, and therefore been subject to manipulation. The practitioner may not have all of the information available to them in order to make an accurate judgment as to whether the data has been tainted by passing through a layer of logic.

The use of interpreted or raw data has implications when considering the DF researcher, too. It is their objective to assess the fitness of the data to broadly match the criteria of Completeness, Accuracy, and Authenticity. Raw data has the benefit of allowing both the practitioner and researcher to assess the validity of the data collected. Yet, there is a drawback, as it can be noted that raw data is generally collected at the lower levels of the DCS. At this lower level, there is a greater chance of there being a voluminous amount of information to gather, and make sense of. For example, the Network Intrusion Detection System (NIDS) SNORT collects data from the lower layers of the OSI stack. The data it collects relates to all the layers of this stack, and therefore, while it is useful to see the data in this raw form before it has passed through the many layers of translation in the OSI stack there is an increased complexity and volume of data associated with this form of raw data. Yet the raw data provides the potential for rich data analysis, if it can be interpreted. There thus is a growing sense within the DF community that raw sources of data are of interest, and therefore an important area of research.

The logging entities that produce the more traditional, interpreted, sources of data, exist at all layers of the network abstraction. For example, from an end-to-end perspective, we can classify contemporary digital evidence collection as pertaining to the host, or the network. When considering a host, we include devices such as PDAs, laptops, servers and so on. Network devices are also capable of being configured to report on their own operation, as well as that of the information passing through the device.

On the host, the layer at which the data is produced is also important. Contemporary logging entities producing event logs and syslog files are often tied into the operating system (OS) itself. For example, the syslog protocol is a logging facility provided on UNIX and Linux systems. This service can be used to report any form of event, from kernel-level events, to those produced by processes working within user space. For example, the Apache Web server can be configured to use the syslog service for reporting activities. The syslog service can be regarded as open, and the operation and implementation of this service is documented. In contrast, the event log service provided by the Microsoft Windows NT family of OS's can be considered as closed, as Microsoft have never published details on how it works. The Windows NT Event Log behaves in a similar fashion to syslog, as it provides a logging interface for bespoke software, along with the operating system to use, but the internals are an unknown. This highlights the problems facing DF investigators. There is an obfuscation of logic and origin when using events generated by the Windows Event Log service. The Apache Web server reports errors to the Windows Event Log, which acts as a back-up when it cannot access its own, logging file services. It would be possible to independently verify whether the actions of the server were those being reported to the event log. This is because Apache is decoupled from the operating system. Yet, when a DF investigator is faced with event logs which pertain to operations of the OS, itself, it is not as easy to decouple events from actions.

Finally, the intentional output of data on a system by a human operator in the form of a file, or document is one of the main sources of data available to the DF investigator. Existing solutions aim to provide faster, easier ways to analyse, and evidence discovery within ever-growing volumes of data.

The Intrusion Detection System (IDS) is the de-facto Logging Entity used both in research, and in practice to provide a basis for study or situational awareness for networked systems. An IDS dynamically monitors the actions taken in a given environment and decides whether these actions are symptomatic of an attack or constitute a legitimate use of the environment. Current IDS design, implementation and research relates specifically to the security field, and is limited to the detection of attacks, intrusions and misuse for the purpose of intrusion detection. A passive system will record policy circumvention events to a log, awaiting a human analyst's response. An active system will perform an action, such as attempting to block the circumvention in some manner, by blocking network access, or by stopping a user from accessing a file on a hard disk. The data can be collected either in real-time or at set periodic intervals.

The post-mortem collection and analysis of DCS for a DF investigation will generally occur within the bounds of a retrospective decision making process. Ideally, the detection of an event at a particular time will also provide for the collection of data pertaining to events occurring both before and after the detected event, as there is a requirement for inculpatory, and exculpatory evidence. The detection should include at least those events immediately preceding and following the detected event, and optionally a plurality of events that precede and/or follow the detected event. This, in effect, not only changes the manner in which the detection function operates, but also the manner in which data is collected, as a-priori decisions must be made as to the fitness of data for an investigation that may take place in the future, or not at all. There will be a need to collect suitable data such that the occurrence of an event can be detected and also verified according to the data fitness requirements of Completeness, Authenticity and Accuracy.

For example, the main focus of contemporary IDS research is interested in the manner in which a signature set can be built, and how quickly and effectively this signature set, or anomaly detection algorithm, can be harnessed to provide the real-time or near real-time analysis required. The issues of false positives and false negatives are of great concern to the this type of research. Yet, the DF community is interested in event reconstruction, and verification activities. This means the traditional security methods and considerations are not as relevant to the DF domain.

The use of unaltered, raw data from a system can provide both an attack, and a research vector. In particular, the use of back door, and/or debugging techniques provide a very powerful method of gaining an insight into how an operating system works, and how security controls can be subverted. By monitoring operating system paths of operation, it is possible for the attacker to gain an insight into the way the system works, and thus subvert its normal mode of operation. Similarly, the researcher does not need to rely on interpreted sources of data in order to gain an insight into how to solve a certain problem.

In the OS security field, there are various techniques for lower level data analysis and collection activities for both research and malicious activities, including memory analysis and low-level disk analysis methods. One technique in particular has been used within the debugging and rootkit domain for some time. The technique, called library interposition, allows an individual to monitor, subvert, or change in some other way the normal operation of the system.

Library interposition involves the use of a software wrapper which is placed around, or hooks, the data structure of interest. Any subsequent calls to this data structure are intercepted by this wrapper.

The DF method of this disclosure involves the collection of system call data, preferably using a software wrapper. The details of the technique differ depending on the OS. Two example embodiments; a Windows based OS and a Linux based OS will be discussed herein. However it will be apparent to those skilled in the art that the collection of system call data can be achieved for any given OS, including any OS based on the x86 CPU architecture (such as both Windows and Linux), and OSs based on other CPU architectures. Further, the collection of system call data can be combined accordingly with the other aspects described in the disclosure, making necessary modifications to those other aspects in order to be compatible with the specific OS in question.

A system call is defined in this disclosure as being any request made between the user space and the kernel space.

In a first embodiment, data is collected by hooking Windows NT system calls. The Windows NT (New Technology) kernel, in some form or another, has provided the basis for Microsoft's Window's flagship Operating Systems, from NT 3.1 (released in 1993), NT 4.0, Windows 2000 (NT 5.0), Windows XP (NT 5.1) and, to a degree, Windows Vista. Each of these releases have been, at least, 32-bit, x86-based OS's. An x86-based OS, such as Windows NT and Linux, operates on fairly similar principles of security and privilege separation. The operating system is divided in a number of different layers (or protection levels) for security purposes, as shown in FIG. 1. Code execution and security is defined by privilege and ability to execute in either of these layers. Code that requires low-level, higher security access executes within the kernel space (Level 0 in FIG. 1), and everything else executes within user space (Levels 1, 2, and 3 in FIG. 1). The reasons for this include; security; performance; and separation of authenticated code. One of the main purposes of this separation is for the separation and provisioning of services by the operating system to the applications that run in user space.

At the hardware level, x86-based processors do not recognise these different layers of the operating system, and instead view all code executing in terms of an eight byte data structure called the Segment Descriptor. It is this Segment Descriptor that maps the OS layers to different hardware runtime levels. The Segment Descriptor contains the start address of the code segment, the length of segment, and the privilege level at which the code will run at. The privilege level is something that the processor does recognise, and will run code accordingly. These privilege levels are divided into different levels of protection, or rings. These rings range from the highest privilege rating of Ring 0, through to Ring 3 as shown in FIG. 1. The inner rings are used for highly critical software modules, such as the Kernel, and the outer rings are used for less critical software modules, or anything that runs in user space. Windows NT only uses rings 0 and 3, due to cross platform and compatibility considerations. Code which executes at a lower privilege level cannot directly call, or access, code which runs at a higher privilege level. If this is attempted, a general protection exception is generated by the CPU. The only way low-privileged modules can access higher-privileged code is via a protected and highly controlled interface called a gate.

Figure 2:
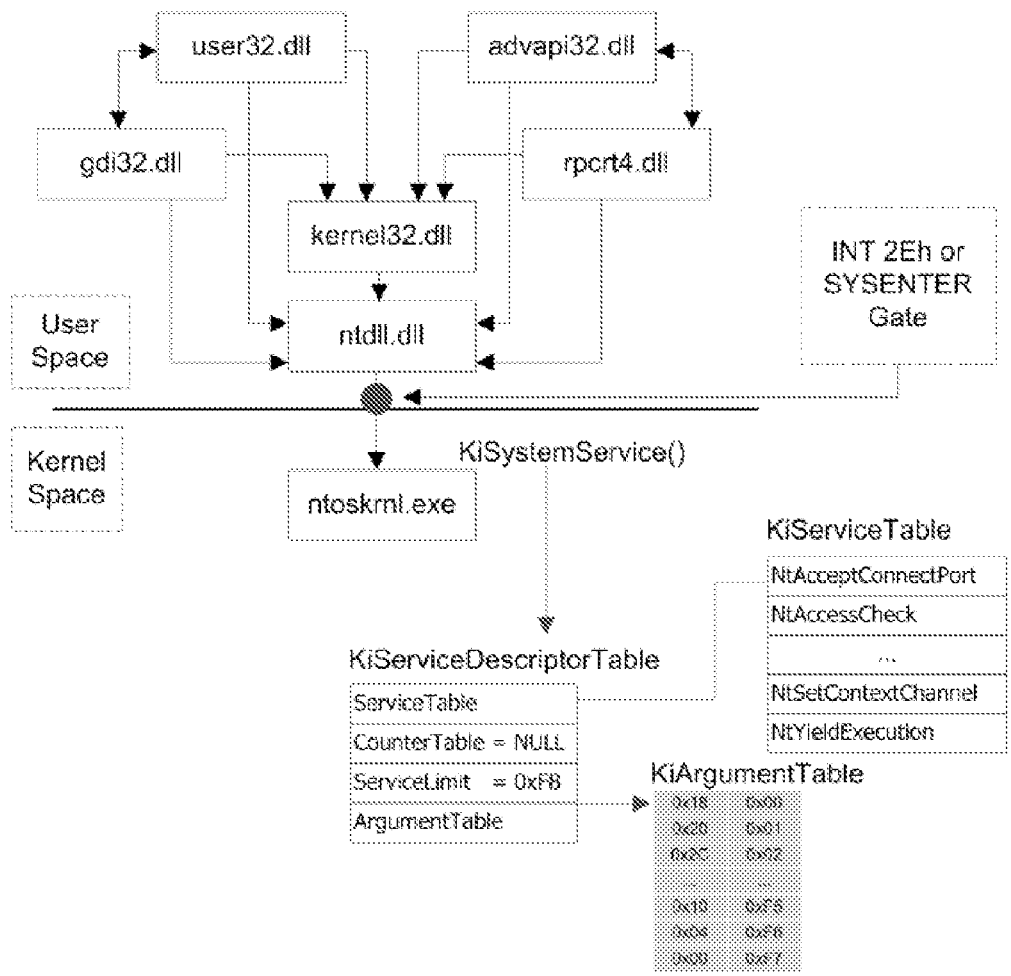
FIG. 2 illustrates Windows NT code execution space and associated data structures.

Windows NT provides a gate to the kernel for code executing in user space to access underlying services. These provide for the provision of core OS services, such as file access, device access, thread handling, registry operations, and so on. FIG. 2 shows an outline of the manner in which this gate can be implemented, and the data structures and libraries involved in this process. For example, if an application running in user space was to request a file write operation, it would call the function WriteFile( ) which is present within the Kernel32.Dll library. This library exports a list of functions which are subtly different to those in the NtDll.Dll, and the parameters and entry points also differ. Once the program has made the call, the parameters are marshalled, and the functions within the NtDll.Dll data structure are called. The NtDll.Dll then calls the NtosKrnl.exe, which contains a data structure called KiSystemService( ) This function then looks up a data structure, or table, called KiServiceTable. Within this table is a description of all the exported functions available to user space, and the parameters that require passing. Further data structures related to the KiServiceTable relate to the length of parameters that must be passed to each system call. It is at this point that the usage of the interrupt gate can differ. These range from the usage of the interrupt gate INT 2eH, the usage of a specialised SYSENTER feature on certain x86 CPUs, or the SYSCALL return. No matter the gate mechanism, the data-table and the result of a system call is the same. The result of a call to the KiSystemService( ) function then causes a hardware interrupt, which causes the system call to be processed. As mentioned above, it is this interaction between user space code modules and the kernel that we define as a System Call. Calls between applications within user space are defined as Function Calls.

Each Release of the OS has a differing number of system calls, and in Windows 2000, 248 of these start with the prefix Nt. System calls prefixed with these symbols describe the base services offered by Windows NT. Within the kernel, the prefix of these system calls are generally interchangeable with the prefix Zw, which represents the manner in which they are called within the kernel. (Zw formatted system calls reside within the ntdll.dll library. The Zw and Nt prefixes merely signify which library the system calls are called from, and a different type of access check. They both access the same, fundamental, services). From the example given previously, within user space, WriteFile( ) would appear without any prefix, NtDll.Dll would marshal it as NtWriteFlle( ) and from within kernel space, if it were called, it would be called as ZwReadFile( ) In spite of this naming difference, they both share the same memory location, and perform the same basic service task. The data structures, and system calls described here form the basis for the Windows NT Native API. This API is not documented by Microsoft, and the number, location, and descriptions of system calls can change with every kernel modification. These modifications can happen with each major OS revision, or with the release of a service pack. However, enough information has been made public to guide the implementation of the DF methods described herein.

The next major aspect of this disclosure relates to the use of sequence matching techniques, which are well established in the bioinformatics field. Sequence Alignment and Multiple Sequence Alignment are well known and studied techniques for quantifying and matching gapped or non-contiguous string sequences. Sequence Alignment (SA) is used to great effect within the field of bioinformatics for protein and DNA sequence matching analysis. Proteins differ from DNA chemically and functionally. DNA is used to store information, and is built up from an alphabet of four nucleotides. Proteins fulfil various functions, as they form the basis of the structures and mechanisms within cells. The functional characteristics of proteins are derived from their ability to fold into specific three dimensional shapes. For example, a protein that folds itself into a stiff rod may be used for structural support. These functional aspects are dictated by the sequence of amino acids that form the basis of the protein sequence. In total, there are twenty amino acids within the protein alphabet. This alphabet comprises of single letter descriptions of amino acids. The full alphabet is presented in Appendix A.

For example, using the one-letter amino acid symbols, a protein sequence would look like:

MLEDKHR

These sequence strings, and the similarity between them, are what biologists search for when performing SA. The similarity (homology) between proteins can give an indication to the evolutionary distance between proteins. This is a powerful technique, as a protein's phylogenetic (physical) structure is expressed solely through these sequence arrangements.

The SA problem can be defined as part of the longest common subsequence (lcs) problem. Formally, this can be described where given two strings $A=a_1 a_2 \ldots a_m$ and $B=b_1 b_2 \ldots b_n$ where $m \leq n$ over alphabet $\Sigma$ size s. The lcs problem is the manner in which the best alignment can be found between A and B of the longest length by introducing gaps. The length of the lcs is the measure of similarity between two sequences. This problem is NP-hard, but is solvable using dynamic programming techniques. There are two general ways in which to solve this problem—local alignment or global alignment.

The Needleman-Wunsch global alignment algorithm is an efficient method to search for a sub-sequence. This method uses a two-dimensional matrix to perform an alignment between two sequences. For example, consider the strings STRAINED and BRAIN. We can try and align these two strings with a simple scoring system which gives +1 for matching letters, −1 for mismatches, and −1 for gaps. The alignment will look something like the following:

```
STRAINED  STRAINED
-BRAIN--  B-RAIN--
```

The above alignment will give the same score, under the scoring system described. The scoring matrix assigns a score to the fitness of each match, and a pointer to the most likely match. By following these pointers, a match is formed, and a score is given to the fitness of match. The algorithm has an initialisation phase, fill phase, and trace back phase.

In the initialisation phase, the first column and row of the matrix is filled with values, as shown in FIG. 3. Each row and column are filled with the gap score (−1), and then multiplied by how far away they are from the origin. The arrows are the pointer to the origin, which ensures that the trace-back phase can occur.

In the fill phase, the matrix is filled with values to indicate the quality of alignment. The method of filling each cell is based on a score determined by either the match score, horizontal gap score or the vertical gap score. The match score is the sum of the diagonal score and the score for a match (+1 or −1). The horizontal gap score is the sum of the cell to the left, and the gap score (−1). The vertical gap score is the sum of the cell above, and the gap score. Once these three scores have been calculated, the highest score of the three is determined, and a pointer is placed to the cell which gives the maximum score. For example, FIG. 4 shows the score given to the match of letter B to letter S. The match score is −1, as the horizontal cell is equal to 0, and there is not a match. The horizontal gap score is −2, as is the vertical gap score. Therefore, the match score square is chosen, as it has the highest value, and the pointer is set to it.

The final phase traces the sequence match through the matrix. This is performed by following the pointers from the bottom right hand side of the matrix back to the origin. FIG. 5 shows the path that will be taken. Matrix trace-back starts from the bottom right corner. The cell pointers lead to the next cell. This technique allows for matches to be made across the entire sequence, hence the term global alignment.

Local sequence alignment is achieved for example by the Smith-Waterman algorithm. This is a modified version of the Needleman-Wunsch algorithm, differing as follows:
- The edges of the matrix are initialised to 0.
- The maximum score is never less than 0, and a pointer will not be added unless the score is greater than 0.
- The trace-back starts from the highest scoring cell, not the bottom right corner of the matrix.

FIG. 6 outlines the difference in the matrix. In this case, the highest scoring cell will be the position to start at. This has a great impact on the manner in which alignments are made, and the eventual score. This technique allows for smaller, local alignments to be made. This is an important distinction, as this algorithm allows for smaller, locally conserved regions of proteins to be highlighted, as opposed to the global string match, which leads to an overall match.

The SA methods outlined thusfar describe the manner in which an alignment can be found between two strings. In order to recognise and score the sometimes subtle evolutionary distance between different proteins, a binary match/no match method will not provide the an accurate enough indicator. An important set of tools and techniques have therefore been developed to allow biologists to view and measure change and similarity over families of related proteins. These are Multiple Sequence Alignment (MSA) and scoring matrices.

Proteins are the products of evolution. Each protein has evolved from a series of mutations, and selections. It is possible to align two closely related proteins and observe similarities at certain positions but differences at others. Molecular biologists think of protein matches in terms of chemical similarity. The neutralist model of molecular evolution tells us that these similarities are due to the fact that proteins have evolved to a certain level of useful functionality that is highly resistant to change. If they were to change, the functionality of the protein may become useless, and thus the protein would be deleted from the population. Therefore, the only changes that occur are those that are classified as neutral mutations, as these have a small impact on the function of the protein. This can be broadly illustrated by the fact that proteins can be divided into a series of chemical relationships, and that certain proteins are more likely to be paired with each other. So whenever a family of proteins are aligned, what is being detected is a certain position within the protein to change.

For example, in the following alignment certain positions are similar and others that have changed:

```
PAMGHDEFPPFPPDEHIKLDKKKGHS

PAMGHDEFPDFPPDEHIKLDKKKGHS

FAMGHDEFPPFPPDEHIKSFKKKGHS

PEMGHDEFPDFPPDEHIKLDKKKGH-

PAMGHDEFPPFPPD--IKLDKKKGHS
```

In this example, the family of aligned proteins have been subjected to a Multiple Sequence Alignment (MSA) in order to determine potential similarity or substitution between related proteins. Performing an alignment of many proteins by hand is a time consuming task, and using SA to align more than three strings is computationally expensive. Therefore, MSA techniques involve the use of a more heuristic approach, which performs a technique known as progressive alignment on all of the strings in order to align regions that are highly conserved (similar). For example, the CLUSTAL method achieves this by first performing a pairwise alignment of each string using a dynamic programming like Needleman-Wunsch. This gives a pairwise score matrix, from which the next part of the process uses to build a tree, which details the scores between different sequences. The most similar sequences are then aligned against each other, with each alignment occurring on successively less similar sequences. As each sequence is added to the multiple alignment, a consensus sequence is arrived at. This is calculated by an analysis of each protein at a certain position, incorporating frequency likelihood at each position.

As mentioned previously, substitution of one amino acid for another is a likely event when looking at closely or even distantly related proteins.

Therefore, the likeliness of a substitution (for either SA or MSA) can be inferred by the use of a scoring matrix (which can also be referred to as a substitution matrix). There are a number of different techniques that can be employed to build a scoring matrix. The most basic scoring matrix is the identity matrix, which gives matching amino acids a score of one, and a mismatch a score of zero. Another is the Percent Accepted Mutation (PAM) matrix, which calculates the similarity between amino acids, and how likely an amino acid will be substituted for another. This method involves the construction of a scoring scheme that is based on theoretical and evolutionary assumptions. Amino acid substitution rates are scored and represented by a $\log_2$ odds ratio, or lod score. The lod score is calculated by the following equation: $s_{ij}=\log_2(q_{ij}/e_{ij})$. The lod score of amino acid pairing ij is $s_{ij}$. This is calculated with the observed probability $q_{ij}$, and expected probability $e_{ij}$.

The BLOcks Substitution Matrix (BLOSUM) also provides a lod score, yet offers a higher sensitivity when performing SA, as it is constructed using an empirical analysis of large data-sets. These data-sets are MSA's of ungapped, highly conserved areas of related proteins that are formed into blocks. These blocks are then analysed to provide the observed probability $q_{ij}$ and expected probability $e_{ij}$.

A further technique that can be employed is frequency domain analysis to detect system call signatures.

The Discrete Fourier Transform (DFT) and its faster algorithmic implementation, the Fast Fourier Transform (FFT) are mathematical tools used to transform a signal in time domain into frequency domain. In the time domain the x axis in a graph is time and the y-axis is amplitude, but in frequency domain the x-axis is replaced the frequency in Hertz (number of cycles per second).

DFT and/or FFT techniques can be applied to a time sequence of system calls to detect any signatures or patterns that are present, exposing periodicity in the system call sequence and thus enabling more efficient detection of user behaviour.

There are different ways in which the signal to which the DFT or FFT is to be applied. Different signals may be selected for the purposes of exposing different properties of a sequence of system calls.

For example, in one embodiment a signal may be constructed by simply assigning a value to a system call (corresponding to amplitude). DFT can be applied to this signal and all the periodic properties in the time sequence were exposed and the spectra can be used as signature to match against live system call data.

In an alternative embodiment, the signal could be constructed with the number of occurrences of a particular system call per unit time. This signal extracted from the same time sequence of system calls will provide a very different signature providing additional information which will provide additional confidence in signature detection.

Frequency Domain Analysis can be applied to multiple system calls simultaneously. There is valuable information in the frequency of various alphabets (in a sequence) at a time for a transaction. Therefore, a frequency domain analysis can comprise constructing a signal on the basis of the number of occurrences of individual alphabets per unit time in the sequence of system calls.

Using Frequency Domain Analysis (FDA) opens up a lot of opportunities and provides a lot of flexibilities in detecting unique signatures in system calls. This technique becomes even more efficient if the signatures are corroborated with time domain analysis techniques.

Having now discussed the nature of digital data and the use of system call data, and sequence alignment and multiple sequence alignment techniques, we now turn to discussion of a digital forensic framework.

Figure 7:
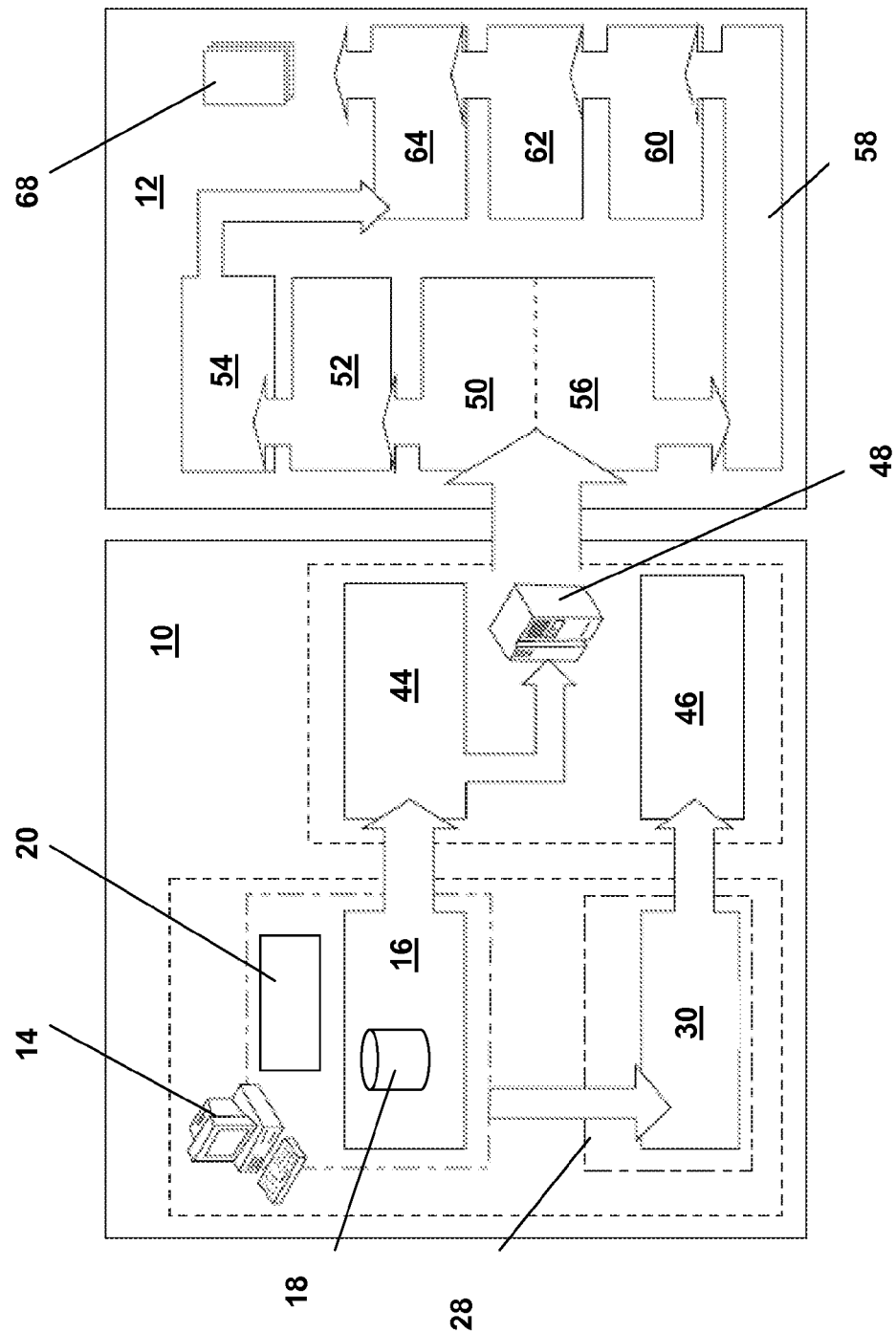
FIG. 7 illustrates a general system for digital forensics.

A digital forensic system is illustrated in FIG. 7. The system comprises a data acquisition means 10 and a data analysis means 12.

A device under test (DUT) 14 can be a single DCS, for example a single computer belonging to an organisation and usually part of a wider computer network. The DUT is provided with a data collection means 16 for the collection of system call data, which is written to a database 18. The database 18 is envisaged as being an integral part of the data collection means 16 and thus will usually be stored at or in the DUT, but it could conceivably be provided external to the DUT.

Figure 8:
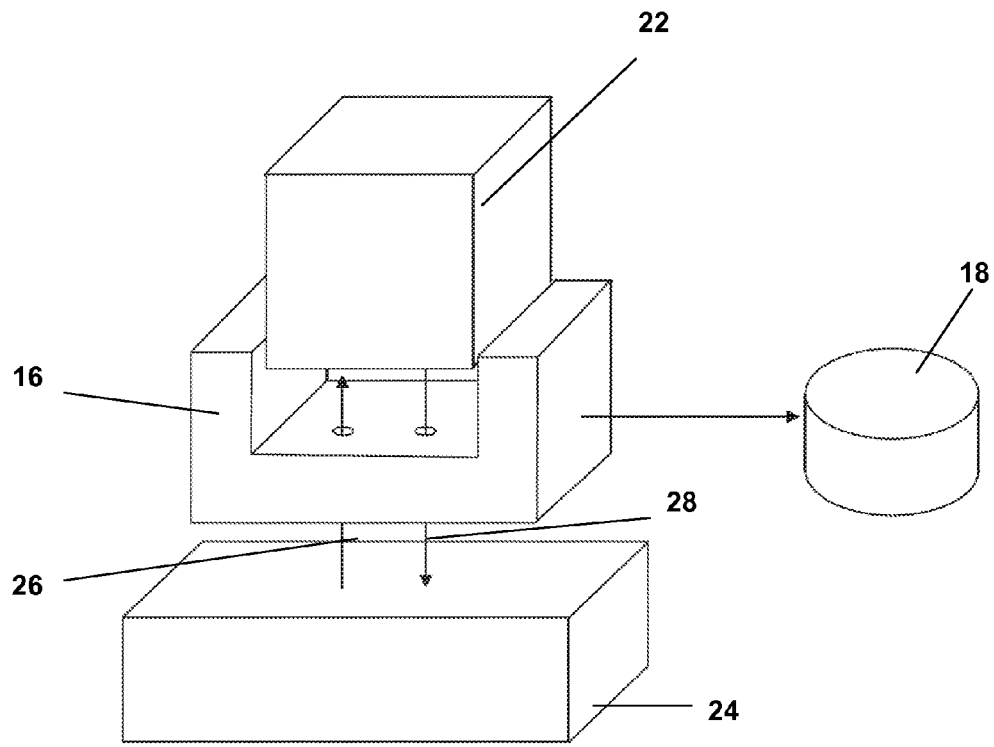
FIG. 8 illustrates the collection of system call data in the system of FIG. 7.

FIG. 8 shows the fundamental operation of the data collection means 16. As shown in the figure, the data collection means 16 sits between the user space 22 and kernel space 24. All system calls 26,28 between the user space 22 and kernel space 24 are intercepted by the data collection means and recorded in the database 18 which can for example be a hard disk or a partition or other portion thereof; or any other suitable memory means.

The data collection means acts to log all system calls made by a user of the DUT. In addition, the DUT is provided with an evidence generation means 20 which acts to perform tests on the DUT and collect evidence from those tests. The tests are in the form of one or more use-cases or scenarios, and are preferably initiated by a supervisor machine 28 which is separate from and/or remote from the DUT 14.

Figure 9:
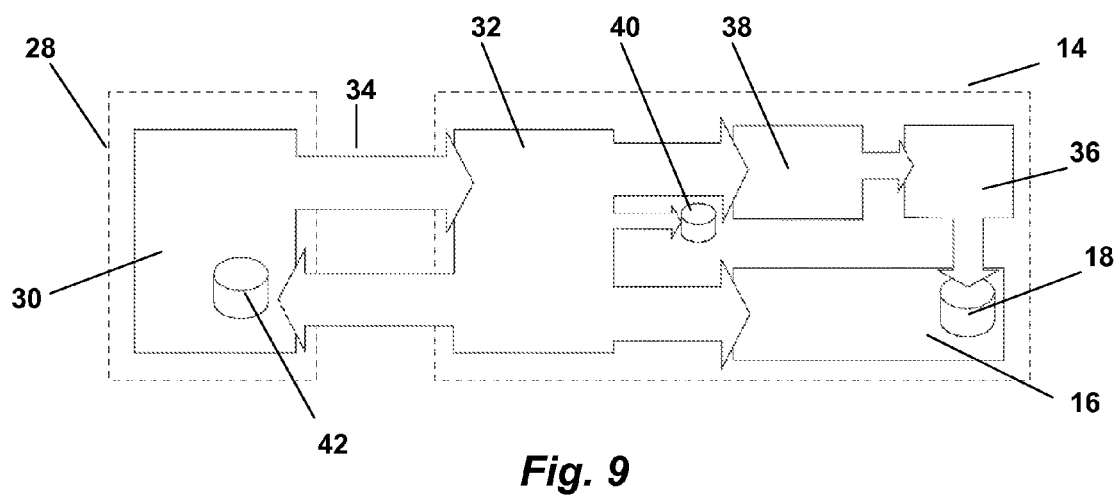
FIG. 9 illustrates the operation of an evidence generation means in the system of FIG. 7.

An embodiment of the evidence generation means 20 is shown in more detail in FIG. 9, in which a DUT 14 comprises a data collection means 16 and other elements that make up the evidence generation means 20. The supervisor machine 28 is provided with a performance monitor means 30 which enables a supervisor to define and run various tests, and then to log and analyse the results. A "test" involves the operation of the DUT according to the chosen test criteria, and will for example involve the replication of a user action. The evidence generation means 20 comprises a scenario robot 32 which receives the test commands 34 and prompts the replication of user actions 36 on the DUT 14 for various corresponding use-case scenarios, optionally with the assistance of a scripting module 38 for the automation of repetitive tasks. The system calls corresponding to the replicated user actions 36 are then intercepted by the data collection means 16 and stored in database 18. The scenario robot 32 also records information that can resolve process names into process ID's (PID's), and this information can be saved to a database 40 after each run of the data collection means 16. Once the monitoring period is over, the scenario robot 32 will ensure both the scripting module 38 and data collection means 16 have exited, to ensure a clean environment for the next experiment run. The collected performance metrics are then sent back to the performance monitor means 30, and stored in a database 42 for analysis. The performance monitor means 30 also acts to remotely monitor various performance metrics relating to the DUT 14.

The performance metrics are subdivided into a number of categories, for example: Memory (which may include Memory Available (Kilobytes), Memory Available (Megabytes), Memory Committed In Use (Bytes)); Processor (which may include Processor Interrupt Time, Processor Privileged Time, Processor Processor Time, Processor User Time); System (which may include File Control Bytes per Second, File Control Operations per Second, File Data Operations per Second, File Read Operations per Second, File Write Operations per Second, System Calls per Second, System Threads).

A sample of each metric can be taken at a predetermined interval, for example one second, for each experiment run, and saved to a performance file on the supervisor machine 28. A remote metric monitoring system is preferred as the monitoring process involves high disk activity. The act of monitoring the DUT would be detected by the data collection means 16, and therefore add unnecessary noise to the trace, and also distort the performance metrics gathered to assess the data collection tool.

System call data provides a rich and interesting source of data that lends itself to DF, for a number of reasons. Firstly, the method does not rely on a set of intermediary, closed applications to interpret or translate the data before it is logged, thus avoiding problems of data interpretation. Secondly, system call data provides a time line of evidence. This will be discussed in more detail below. Thirdly, the data describes core system activity. System calls are invoked whenever a core system service is required by processes running in user space. Since the data describes fundamental OS activity, any deviation from expected patterns of operation would indicate that the system was not working in the expected manner. Deviation from normal OS operation at this level generally causes the OS to halt altogether, a memory dump to take place, and for the system to reboot.

A further important characteristic is that data of this method originates from a mid-level choke point. Data gathered from layers higher up in the OS are at risk of being tampered with. However integrity of system call data is ensured by the present method as this data is gathered from an interrupt gate. The request for a system call causes an interrupt to be issued. This request is processed at a 'choke point', around which no other requests can be made. If we assume that the kernel is clean then it is very difficult to change or otherwise falsify the data collected by this technique. Collation of data at this point is also a preferable alternative to other data collection methods which produce either too much, or too little data. For example, memory dump analysis can produce voluminous amounts of data.

Turning back to FIG. 7, the data collected by the data collection means 16 is then processed by a data formatting means 44 into a sequence format, as will be discussed in more detail below. Similarly, the data collected by the performance monitor means 30 is processed by a compiler means 46 for the conversion to a sequence format. The sequence-formatted data from both the data formatting means 44 and the compiler means 36 is stored in a database 48.

The data analysis means 12 comprises different types of tools, file types and processes for the analysis and extraction of sequences of system calls within traces. The upper path describes the manner in which the system call data collected by the data collection means 16 is processed after being collected from the DUT 14, and transformed into the lod matrix used for custom statistical calculations. The encoded trace data 50 from the database 48 is fed to a sequence alignment algorithm 52, which is preferably a multiple sequence alignment algorithm, and matrix building means 54.

The lower path describes the way in which a trace from a test sequence is extracted from the database 48. The encoded trace data 50 from the database 48 forms a database query output 56 (for example, an SQL query output) which is input to an analysis module 58. The analysis module 58 is used to identify a "fingerprint" 60 of system activity which is stored in a fingerprint database 62. These fingerprints are then used later on to identify traces gathered from the DUT. The analysis module 58 can in some embodiments include tools for heuristic and/or visual identification methods. The sequence matching means 64 then compares the data from the matrix building means 54 with a selected fingerprint from the fingerprint database 62 to generate a report 68 which can include search results and statistics.

Figure 9A:
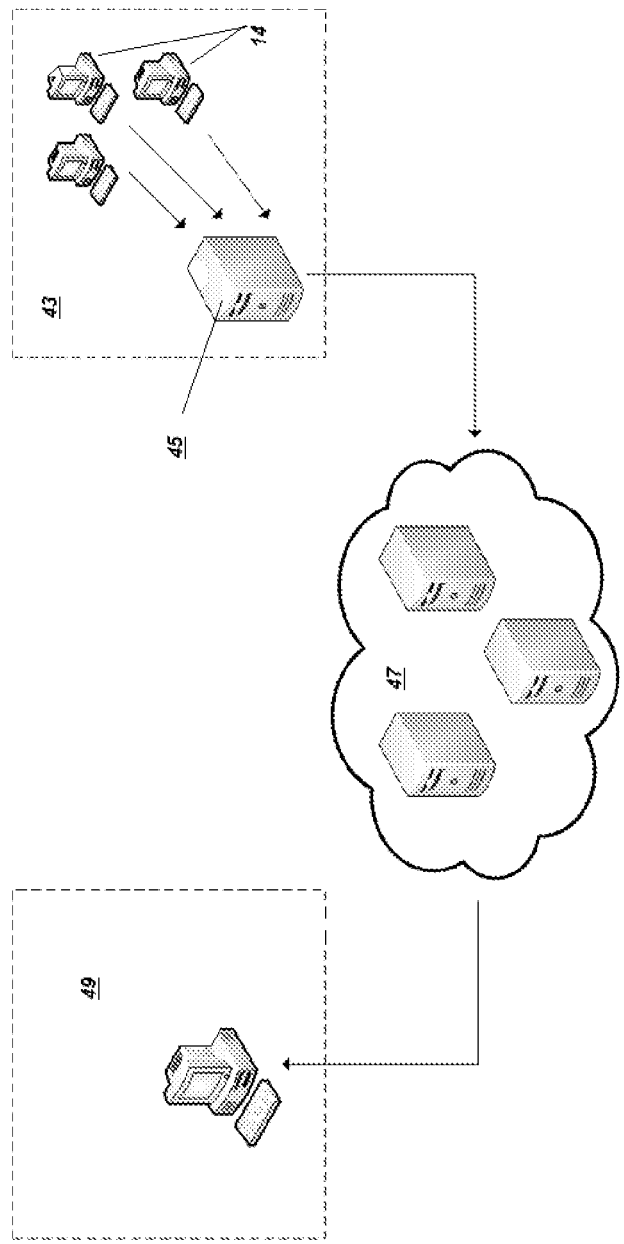
FIG. 9A illustrates an example implementation of a digital forensics sysem, according to a framework in which components of the system are distributed.

FIGS. 7 to 9 illustrate the logical relationship between the various components of DF systems according to various embodiments. It is to be appreciated that many different physical layouts may be employed, depending on the nature and needs of an organisation employing DF techniques. As an example, a distributed framework can be employed, one embodiment of which is shown in FIG. 9A which illustrates a clustered service-oriented architecture (SOA) layout for a DF system, which is applicable to any of the embodiments mentioned above and their variations.

A host organisation 43 comprises one or more DUT's 14. The sequences collected from the DUT's are sent across a network to a buffer 45, which collects and coordinates data to be sent for storage or analysis within a cluster 47 which comprises a number of linked computing resources. A single buffer 45 may collect many sequences from many DUT's within the host network 43.

After the sequences have been sent to the cluster 47, storage, analysis and reporting processes can be initiated. The cluster 47 can be physically and logically independent of the organisation 43, and therefore can be hosted within, or outside the organisation 43. It is also possible for an external party 49, wishing to investigate or otherwise inspect sequences from a DUT 14, to interrogate the information contained within the cluster 47, for example using a web browser.

A clustered SOA framework allows for the storage, analysis and dissemination of sequences from DUT'S on one or many computer systems. This approach is advantageous due to the fact that storage and analysis of sequences can be scaled as and when necessary. It also allows for storage of data and provision of analysis services on other sites, not owned or operated by the host organisation.

Other distributed frameworks may be employed as appropriate.

The way in which SA algorithms can assign a metric to similarity between sequences offers a unique chance to not only recognise in a computationally efficient manner the patterns of activity, but also to assign some form of statistical result or test to how close a match the pattern (and thus action) is, and the likeliness of the event of being generated as part of a set of malicious data.

The process of extracting and performing a sequence alignment includes the following activities:

1. Establish known fingerprints of activity. This steps involves the identification of a set of sequences, or fingerprints, of interest within a set of known traces which describe known activities on the system.

2. Construct a database of known Fingerprints. This is achieved by using database creation tools that are compatible with data produced by sequence matching algorithms.

3. Perform a sequence analysis. A whole trace file containing unknown activity is queried against the database, and the SA algorithm can be employed to perform a search, matching all relevant known sequences within the fingerprint database.

Figure 10:
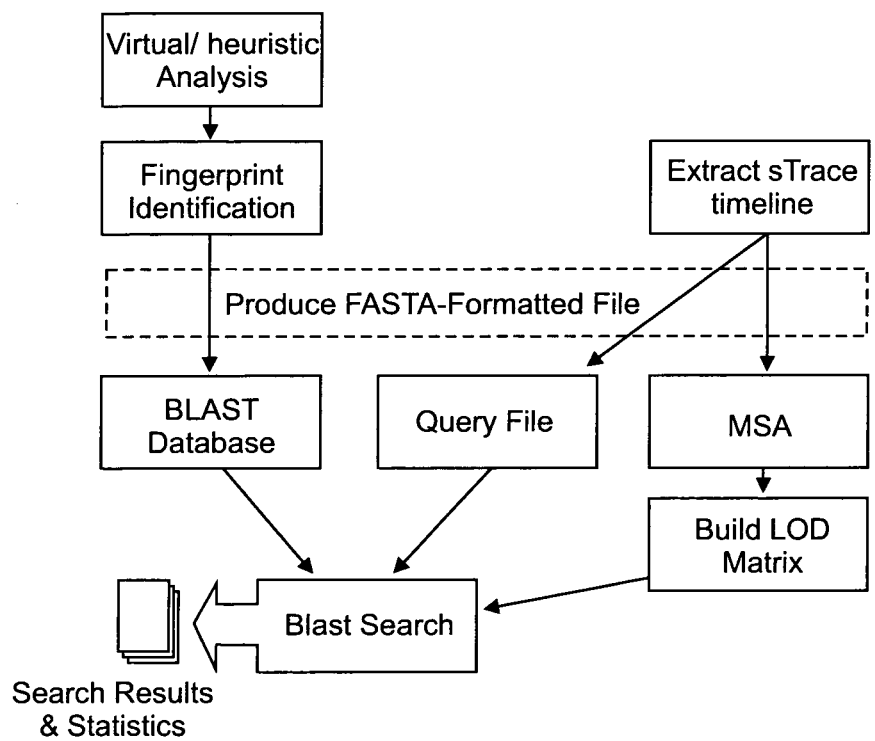
FIG. 10 illustrates a digital forensic method.

FIG. 10 describes the manner in which components of the data analysis suite 12 are constructed, for a particular embodiment. The relevant data originates from a sTrace file, gathered from a DUT. Three components used in an analysis are:

1. Scoring matrix. The lod matrix is calculated after an MSA is performed on a set of sTrace log files that have been converted into the appropriate format. These log files will be analysed for areas of similarity, which are then used to help calculate the lod matrix. A lod matrix does not need to be generated every time an alignment takes places, as it can be used to describe the probability of sequence calls on DUT's that posses similar software configurations.

2. BLAST Database. This is composed of a number of fingerprints, which have been extracted from sTrace log files using heuristic and visual analysis. These will be extracted for a set of DUTs for use in future investigations.

3. Query File. This is the sTrace log file that has been collected from the DUT, and needs to be subjected to sequence alignment in order to verify that certain actions took place.

As FIG. 10 demonstrates, each component is formatted as the protein alphabet (FASTA format), before use during the sequence alignment. A playback system can be provided for the simulation and display of fundamental operating system activities on a replicated OS. The data types collected provide the opportunity to replay an activity, linked via a process, conducted on a DUT 14. For each system call gathered by the system, a number of other, fundamental, data types are gathered, thus allowing a link to be made between the system call gathered, or service request made of the Operating System (OS), and the process calling the service, or action associated with the call.

In a preferred embodiment, the data collection means gathers a process ID (PID), a time stamp (tStamp), a system call name (name), and a number of associated parameters (parameters) of the system calls. An activity playback system can use the tStamp as a temporal foundation for playback, while the PID provides the playback system with information on the process to display in the replicated OS. The system call name provides the necessary information for replicating user activity, and optionally the parameters when present can provide part of the necessary information to ascertain the activities undertaken by the user on the DUT. A system call belongs to a process, which is indicated by the PID. A PID is necessary to reconstruct an event, as it gives context to the sequence of calls. A PID is desirable to reconstruct the event. However, if a fingerprint of activity has been identified from a previous heuristic analysis, and the sequences match, the event could be verified without the PID. A visual representation of the process would not be possible in the playback system, and would need to be replaced by a generic representation.

Figure 11:
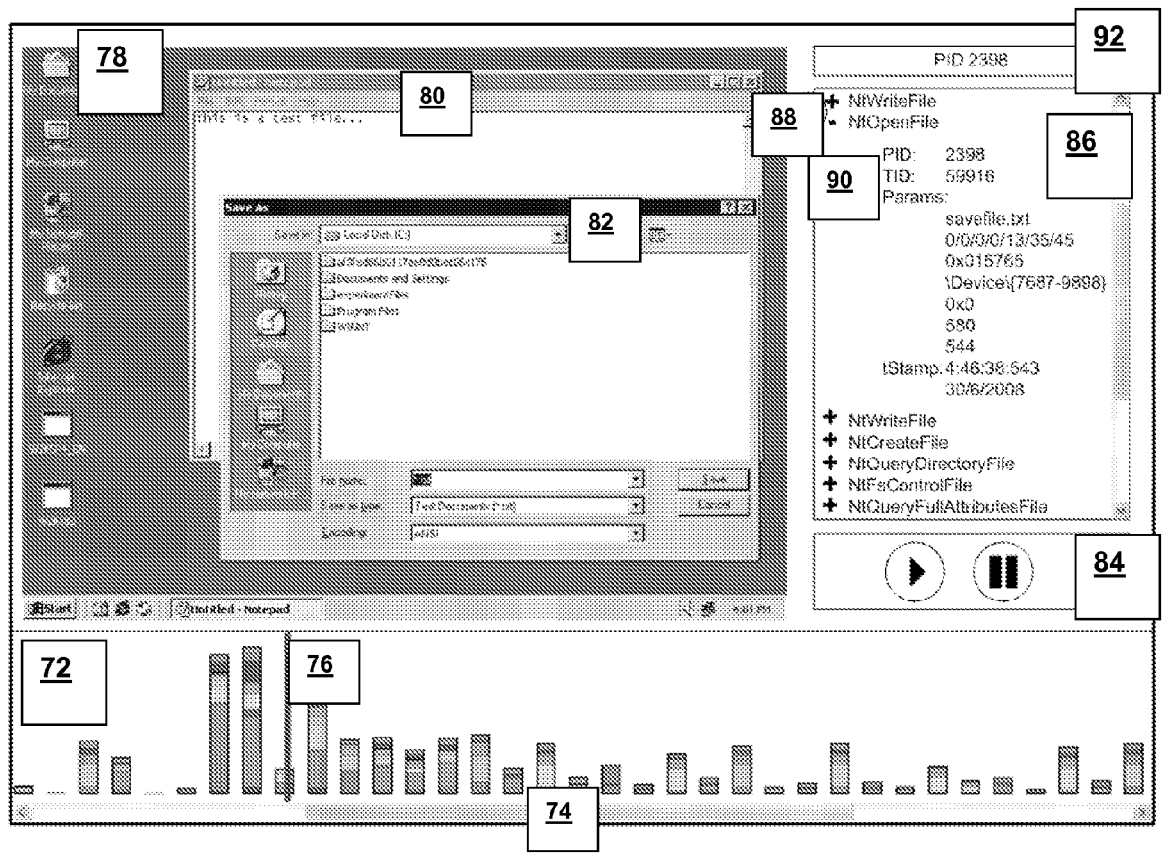
FIG. 11 illustrates an embodiment of a playback technique.

A typical playback scenario would include a visual representation of the actions undertaken on the DUT by the user, a timeline of activity, and the ability to pause or replay the activities. As this form of system may be used in a legal setting, for example in a court room, the visual elements of the playback system would mimic the way the operating system looks. FIG. 11 illustrates an example representation of a playback facility. A timeline 72 is provided which shows a graphical overview of activity on the DUT 14, and can be navigated via the scrollbar 74 at the bottom of the main window. The timeline will be populated with the tStamp and system call name data types. A time slice can be of any chosen duration, for example 10 milliseconds. Each column represented on the timeline 72 indicates the number of system calls recorded per time slice. The taller the bar, the more system calls gathered at that time slice, and therefore activity on the DUT.

A cursor bar 76 shows the current point of playback. It can be dragged by an investigator in order to manually fast forward, or reverse the playback. As the investigator drags the red bar, the playback continues at an accelerated pace, showing highlights of the playback. Additionally, playback buttons 84 are provided for the control of the playback.

The activity of the system happening at the time slice indicated by the cursor bar 76 is represented on a playback window 78. This window will show as accurate a representation of the DUT as possible. It will represent the operating system, and any associated processes that are to be invoked, as specified by the PID data type. Where present, parameter data will be used to populate the display with visual representations of the processes invoked, and the actual parameter data gathered from the system call associated with the process. In the illustration, a text editor displays the text "This is a test file . . . ". This data was gathered from the parameters associated with a sequence of system calls that indicate file save activities. The system call name data will instruct the playback facility as to what action should be presented on the playback window 78. For example, in FIG. 11 a user is in the process of saving the text entered in the text editor to disk. This will again be indicated by a sequence of system calls associated with the user saving data to disk. The parameters for this playback will also be contained within the parameters associated with these system calls. For example, a prompt to display window 80 would be indicated by the parameter contained within the system call and the PID. Window 82 would also be displayed, as a sequence of system calls has been identified as being a save-file request associated with the PID.

A detailed information window 86 provides a text-based representation of the system calls called at a particular time slice. This will allow the investigator to explore in greater depth the details associated with the system calls at a particular time. Each system call listed can have next to it an "expand" icon 88, preferably a "+" sign, that upon selection allows an investigator to expand the view of the relevant system call. Once expanded the view can be collapsed, by selection of a "collapse" icon, preferably a "−" sign. The expanded view 90 can include, inter alia, associated system call parameters, time slice information, PID, thread information, parameter information.

A filter window 92 is provided for the entry of criteria to be searched for display. The investigator can filter out or search for certain data types of interest. For example, if the investigator is interested in the PID 2398, then all associated system calls will be presented in the detailed information view. This would also be reflected on the timeline, and main viewing window, where the associated system calls will be displayed.

In order to simulate user events as they happened in the past, the system looks ahead to a time slice in the future with respect to the cursor bar 76 and compiles the data for subsequent display. This is because the data presented in the process information window 78 is not committed to storage until the necessary system call has been invoked. For example, in FIG. 11, the text editor displays a line of text. This data is not known to the OS until it is committed to storage via the relevant system call that writes the data to file. Therefore, for the playback utility to present it as realistic text within the process window, it needs to be able to read ahead and then re-organise the events for display. The same concept applies to user initiated system events. For example, FIG. 11 shows a save dialog window opening. This event is represented in the data as a sequence. This sequence can then be represented by the appropriate graphic, in this case, a save dialog.

This compilation of the sequences of system calls that constitute the user interaction with the DUT should be performed with the aid of sequence alignment techniques. Each interaction with the OS by the processes and the user will be represented by sequences of system calls, which cannot be easily identified by standard, regular expression, pattern matching techniques. Therefore, the actions to be displayed in the main window must be compiled and pre-classified. The sequence alignment techniques discussed elsewhere in this document will be required in order to accurately identify the non-contiguous sequences of system calls contained within the recording of the DUT.

Some common aspects of user interaction are not captured by the system, for example mouse movement or speed of typing. This type of data can be replicated for the playback by using normative assumptions, or it can be collected by additional higher level monitoring techniques, although data collected at this level is harder to verify. In general however, this type of data will not be important for forensic analysis.

A modification to the playback technique can be employed for cases where the system calls relate to hidden, or transparent data operations. For example, a user on the DUT may execute a command via a shell (command-line) interface, as opposed to using a Graphical User Environment (GUI). If the command is issued via the OS shell, then the actions taken on the DUT will be discreet. An alternative set of visual metaphors can be provided in order to represent the way in which the system state has been altered.

Specific embodiments of the system illustrated in FIGS. 7 to 10 will now be described. As described above, the invention can be implemented for various different OS's. In the description that follows (as for the preceding description) it is generally to be assumed that any named element is OS agnostic, unless specifically stated otherwise; and that components will in general be interchangeable unless specifically stated otherwise.

Figure 12:
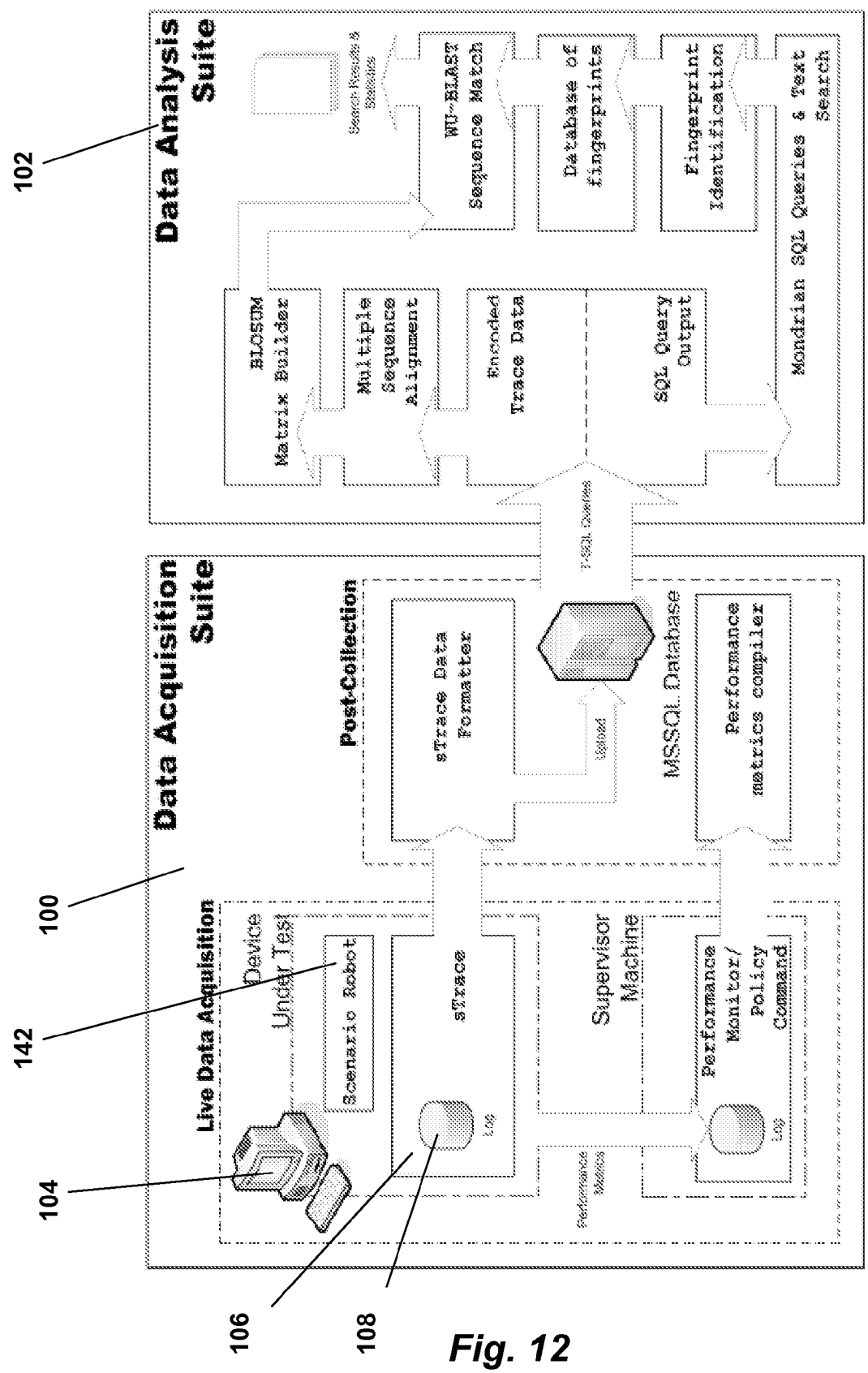
FIG. 12 illustrates an alternative embodiment of a system for digital forensics.

FIG. 12 illustrates a specific embodiment of a DF system, comprising a data acquisition means 100 and a data analysis means 102. A device under test 104 runs sTrace 106 as a data collection means for the collection of system call data. sTrace has existed in one form or another for UNIX-like platforms for some time, yet the version used in this embodiment is built specifically for debugging purposes within the Windows NT family of operating systems. sTrace observes the choke point at which system calls are serviced, as outlined by the FIG. 8 (sTrace functions as the illustrated data collection means 16).

The sTrace tool is composed of two main elements: a driver that operates within the kernel; and a program that loads and initialises the driver with the command line parameters. The driver is designed to operate with full administrative rights within the NT kernel. This is an important aspect, as logging to the hard disk (or other suitable storage device) is carried out via calls to the kernel. If the driver operated outside of the kernel a feedback effect would be generated because the very act of monitoring system activity would call write file from user space.

The sTrace tool is capable of monitoring the native API system calls on Windows 2000 and Windows XP OS's, and should also be compatible with other OS's from Microsoft and other vendors. It monitors system calls on either a global (all processes) or local (single process) scale. It is also capable of filtering and thus monitoring a single system call, a subset of all system calls, or all system calls at once. The way in which the sets of system calls are split into sets reflects Microsoft's kernel services design. This is important as it offers us the chance to monitor certain specific services, which in turn allows fine-grained monitoring schemes.

In Windows, each system call is classified according to a category which provides a core service. Each category contains a subset of the total number of system calls supported by the OS. sTrace can filter the system calls on the system with a command line option to filter either by category, or individually specified system call names. The following service categories are available: SYSTEM (These services monitor system performance and operation, and report on the system as a whole); OBJECT (Object system services perform operations on general system objects. For example, querying and setting object attributes, such as handle or name information); MEMORY (This service provides for the manipulation of virtual memory); SECTION (A section object is an object that can be mapped into the virtual address space of a process. This subset of calls provides services for the manipulation of section objects); THREAD (for the manipulation of thread objects); PROCESS (for the manipulation of process objects); JOB; TOKEN (Token objects encapsulate the privileges and access rights of a thread or a process); SYNCH (These system calls are used to create and manipulate objects that are used to synchronize threads); TIME (Calls concerned with system time and timing capability); PROFILE (System calls that create and manipulate objects related to execution profiling); PORT (Provides for the creation and manipulation of port objects, which facilitate communications between processes); FILE (Provides for the creation and manipulation of file objects); KEY (Provides for the creation and manipulation of objects relating to the registry); SECURITY (System services that provide checks and access rights for private objects); MISC (System services that do not fit into any other category).

The raw data output provided by sTrace (hereafter referred to as a "trace" or a "trace file") is highly detailed, and for a meaningful data analysis to take place, the trace files are parsed and added to a database 18 which. To make this process easier, the present system provides a customised version of sTrace that adds extra information to each system call recorded to disk. Each system call logged by sTrace is represented by a line or tuple within the trace file. In a modification from the existing tool, the fields saved to the trace can be encapsulated by XML-like tags. These tags reflect the fundamental structure of a system call, function of sTrace and associated data that gives the system call context within the OS.

A trace contains 1 to n lines, or tuples, where n is constrained by the length of time the trace is taken over. Each tuple contains information about a single system call that has been captured. In a preferred embodiment, each system call is described by the following set of XML-like tags:

<sq><sq>—Sequence Number: The sequence number is an integer which numbered ordering within each file provided by sTrace. Each trace tuple is numbered from 1 to n, thus providing trace-file relative numbering.

<pid><pid>—Process ID: An integer indicating the OS assigned Process ID of the process calling the system call.

<tid><tid>—Thread ID: An integer indicating the thread which is assigned to execute this particular task for the process.

<fn><fn>—System Call Name: The name of the system call being called. In Windows NT OS's the system call will have a prefix of Nt.

<params><params>—Parameter List: A system call has the same syntax and parameter acceptance process as other languages that use C-like syntax. When a system call is invoked, it is generally passed a list of parameters. The <params> tag will encompass one or more set of <p></p> tags which contain the parameter being passed to the system call. The number of parameters being passed to the system call depend entirely on the functionality of the system call, and are finite. For example, the NtCreateFile system call accepts 11 parameters, which include a file handle, object attribute, share access, and so on.

<rs><rs>—Return Status: Not all system calls contain a return status. If they do, this field is included in the tuple.

<datestamp><datestamp>—Date Stamp: Returns a date value in dd/mm/yyyy format from the SYSTEMTIME structure, as returned by the GetSystemTime( ) function.

<h><h>—Hours: The hour at which the system call was monitored, returns a WORD from the SYSTEMTIME structure, as returned by the GetSystemTime( ) function.

<m><m>—Minutes: The minute at which the system call was monitored, returns a WORD from the SYSTEMTIME structure, as returned by the GetSystemTime( ) function.

<s><s>—Seconds: The second at which the system call was monitored, returns a WORD from the SYSTEMTIME structure, as returned by the GetSystemTime( ) function.

<ms><ms>—Milliseconds: The millisecond at which the system call was monitored, returns a WORD from the SYSTEMTIME structure, as returned by the GetSystemTime( ) function.

The following is an example tuple from a trace of a Web browser accessing a website. It shows all of the data types associated with the NtReadFile system call. Each trace is in ASCII format.

EXAMPLE TUPLE

```
<sq>10051<sq>
<pid>1120<pid>
<tid>1232<tid>
<fn>NtReadFile<fn>
<params>
<p>744</ p>
<p>0</ p>
<p>0</ p>
<p>0</ p>
<p>512</ p>
<p>0x0</ p>
<p>0</ p>
<p>...</ p>
<p>{status=0x0, info=512}</ p>
<p
"\0\1\0\10\221\0\0\2\0\0\0\21F\202\235\350F\202\235\351\0\0\0\0\0\0\0\0
\0\0S\0\0\1\20HTTP:http://www.google.com/firefox?client=firefox-
a&rls=org.mozilla:en-US:official\0request-method\0GET\0response-
head\0HTTP/1.1 302 Found\15\12Location:
http://www.google.co.uk/firefox?client=firefox-a&rls=org.mozilla:en-
US:official\15\12Cache-Control: private\15\12Content-Type:
text/html\15\12Server: GWS/2.1\15\12Content-Encoding: gzip\15\12Date:
Wed, 27 Jun 2007
17:31:21GMT\15\12\0\0\0\0\0\0\0\0\0\0\0\0\0\0\0\0\0\0\0\0\0</p>
<params>
<dateStamp >27/6/2007<dateStamp>
<h>17<h>
<m>29<m>
<s>56<s>
<ms>805<ms>
```

Figure 14:
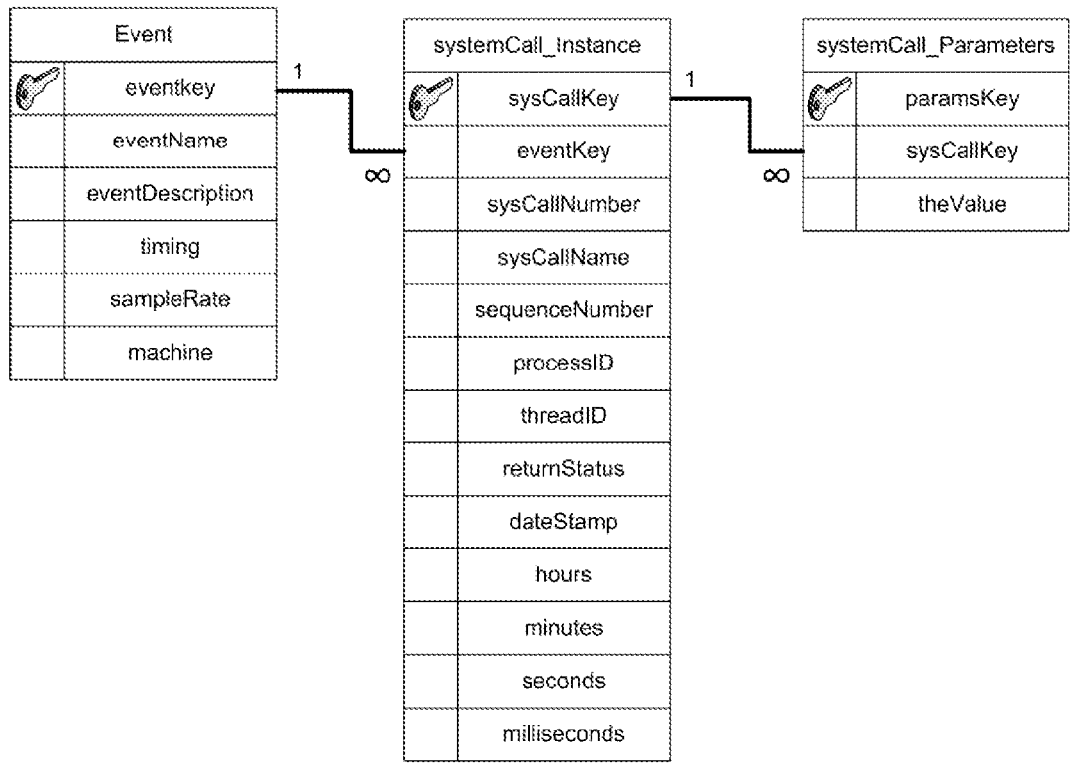
FIG. 14 illustrates an example entity-relationship diagram showing an example structure of a database for storing system call data collected from a data collection means.

Each trace is stored on the device under test. When required (at the end of a testing run or at a use-monitoring point), the data is extracted from the machine, parsed, and uploaded to a database server. The Entity-Relationship (ER) diagram of FIG. 14 outlines the database structure. The existing structure of each tuple was used as a guide for these tables. Each trace file is treated as an Event. Each Event may have 0 to ∞ system calls associated with it, and each system call may have 1 to n parameters associated with it.

Each system call is given a specific number for fast identification. This is the value sysCallNumber in the systemCall_Instance table. For example, the FILE subset of system calls can be numbered 1 to 28, as shown in Appendix B. This encoding creates a bespoke alphabet of 248 letters. It is 248 in length, as this is how many system calls are exported by Windows 2000. The length will depend on the version of the OS, as they each export a different number of calls. As discussed above, the lcs problem requires a finite alphabet. This encoding of system calls allows an easy translation from the system call alphabet to the protein alphabet used for a sequence alignment technique. When a trace file or parts of a trace file are extracted from the database, they are identified as being part of an Event. Thus, a trace extracted from the database is identified with the suffix E and the number assigned to it as found in the eventKey table. For example: E44, being a text input scenario for Notepad, the Microsoft text editor.

This user scenario was designed to provide the most basic of user interaction with the DUT, in order to establish the effect of monitoring system calls. It was also chosen as the FILE subset is of interest. The actions undertaken during this activity attempt to include a number of main activities that may be of interest during a DF investigation. The total monitoring period for this activity is 120 seconds. The Notepad Scenario consists of the following actions:
1. Notepad.exe is invoked.
2. A string is inputted into the main window of Notepad.
3. The file is saved to disk.
4. Notepad is closed
5. A command prompt is opened.
6. The recently saved file is deleted from the location on disk (or other suitable storage device) by a command line argument.

Figure 13:
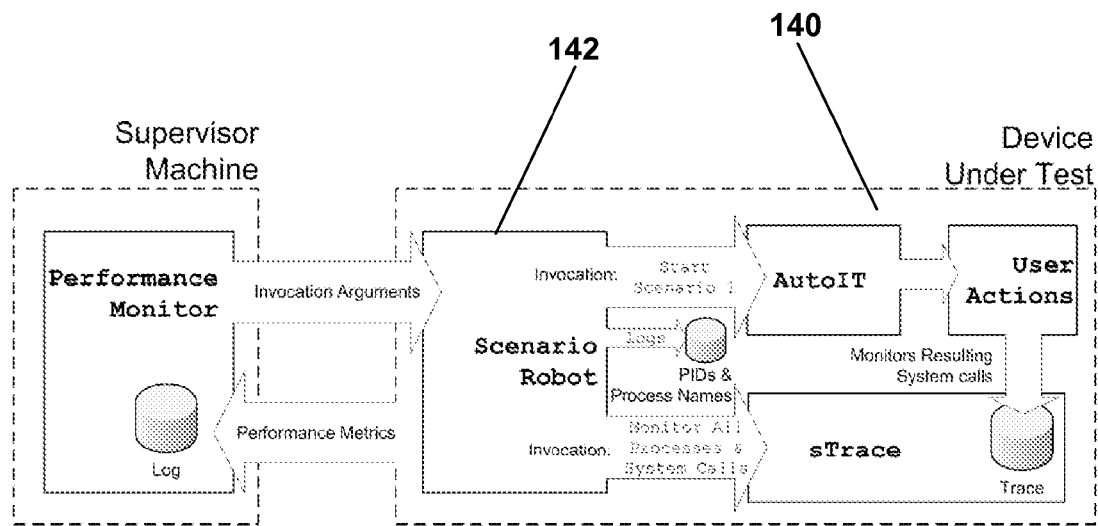
FIG. 13 illustrates the operation of an evidence generation means in the system of FIG. 12.

The activities or scenarios used to generated actions that sTrace monitors are executed by a scripting module which in one embodiment can be an AutoIT module 140 (see FIG. 13). AutoIT is automation software that can record user activities, and play them back, thus recreating user actions on the system. It provides a high level interface for recreating activities within user space, thus simulating the high level functions called by a user. AutoIT is controlled by Scenario Robot software 142 which resides on the machine.

It is described above that the digital evidence analysis involves establishing known fingerprints of activity, constructing a database of known fingerprints, and performing a sequence analysis. To aid understanding of the method, experiments have been performed to illustrate a specific example implementation, which will now be discussed.

An initial data analysis was performed on a number of trace files. This process was performed manually, and partly with the aid of visualisation tools discussed later. Intuitively, if certain user actions were repeated, they would form patterns within the trace file. When the database was queried to return only the system call names, it was observed that a number of patterns were apparent in the database output. Certain patterns were identified as repeating a number of times. For example, the following, reoccurring, sequence of system calls were identified in the trace E44:
NtFsControlFile
NtFsControlFile
NtQueryFullAttributesFile
NtFsControlFile
NtFsControlFile
NtCreateFile Using the system call numbering convention in accordance with Appendix B, the above sequence in number format will be: 20 20 14 20 20 28.

Figures 15, 16:
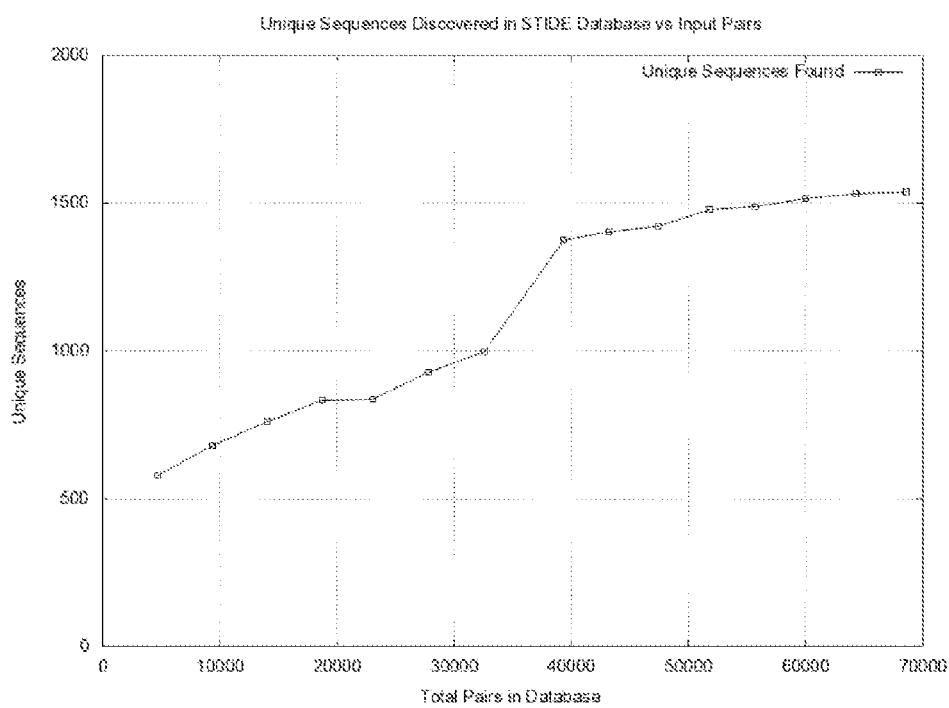
FIG. 15 illustrates an extract of system call data collected for an example file manipulation scenario.
FIG. 16 illustrates the comparison of total pairs added to a database as compared with the number of unique sequences discovered by a sequence discovery tool.

Sequences of system calls were extracted from the database and encoded in number format. This presented a view of the underlying structures of the patterns which represented actions the OS performs when services are requested. For example, FIG. 15 shows a block of text which is an extract from one of the file manipulation scenarios, E44. This extract shows a time-line of activity, starting from the top-left corner, and proceeding from left to right, and shows only system calls from the FILE subset. In order to match, or make sense of this data, pattern matching techniques were investigated. Suitable pattern matching techniques include, for example, sequence mining (such as lookahead pairs), frequency-based methods (such as n-gram and EMERALD), data mining approaches (such as RIPPER), and finite state machines (such as Hidden Markov Models (HMMs)).

For the purposes of demonstrating the present method and system, we have used the Sequence Time-Delay Embedding (STIDE) tool (see S. A. Hofmeyr, S. Forrest, and A. Somayaji, "Intrusion detection using sequences of system calls", Journal of Computer Security, vol. 6, no. 3, pp. 151-180, 1998). This is a tool for discovering sequences within paired input data files representing system or function call traces. In this example, the input data is the system call number, and the process ID it belongs to. STIDE discovers sequences by sliding a window the size of k across the trace. The following is an example of the type of input STIDE expects. The first column is the process ID, and the second is the number assigned to the particular system function being called.

| PID | Number |
| --- | --- |
| 784 | 20 |
| 784 | 17 |
| 784 | 11 |
| 784 | 11 |
| 784 | 11 |
| 516 | 10 |
| 516 | 20 |
| 516 | 3 |
| 544 | 27 |
| 544 | 13 |

For example, if k was set to 3, the input listed above would generate the sequences: 20,17,11; 17,11,11; 11,11,11; 11,11,20; 11,10,20; 10,20,3; 20,3,27. These unique sequences are then stored in a database of known sequences. Each database can be grown by adding more traces to it. Each set of traces is added to the database and stored as trees. Initially, three databases were created: a small, medium, and large database. Each database was filled with sequences of k=6, from the traces gathered during the user activity generated by the scenario robot. FIG. 16 shows the number of unique sequences found against the number of input pairs into the large database, showing an increase in unique pairs found with the number of input pairs in a database.

The original STIDE was designed to discover anomalous sequences, and disregard known sequences. For present purposes it was modified. It still creates a database with known sequences, as shown above, but when a new sequence is compared against it, instead of reporting anomalies, it is reconfigured to report known sequences. This gives the ability to quickly establish and review sequences of interest. The modified STIDE manages to detect a greater number of sequences in the file with a similar set of user actions in it. This shows that traces of similar user actions will generally contain similar sequences of system calls.

Although STIDE is adequate at identifying unique sequences of data, there are a number of problems with it pertaining to DF. The first issue relates to the type of sequences produced by STIDE. This modified version of STIDE produces unique sequences, and can identify sequences that are exactly the same in new trace files. When observing the data in greater detail in the trace files, it was observed that the patterns did reoccur, but were non-contiguous, or gapped, in a similar manner to protein strings. When considering these short patterns of activity, a more flexible sequence recognition and matching technique is required. The lcs problem and its solution through local or global alignment as discussed above addresses this very problem. Secondly, the original purpose of STIDE is to model the Unix operating system as a biological system for performing intrusion detection, with speed of detection being the main motivation in order to implement a near real time IDS method. Therefore, fast recognition of short sequences is desirable. However in the field of DF, the time and decision constraints are very different, the data collection being real time and the decision making process being retroactive, or unconstrained, with wholesale collection of data and storage of data until it is required for analysis. The present technique solves this problem by allowing for the capture and archival of all the fundamental activities of a system in real time. The analysis techniques presented then allow for verification of user activity to take place at a later point in time.

So far, SA, MSA and scoring matrices have been described with relation to the field of bioinformatics. There are however some differences between biological data and system call data. For example, system calls do not display substitution, evolution, or change, in the same way as proteins do. Yet, there are some similarities that remain pertinent. In particular, the work with the STIDE sequence identification package and heuristic analysis has shown that that the sequence of system calls, much like protein letter sequence, is an indication of the structure of a system call request. For example, a fingerprint of activity can be identified within a trace that may repeat in either a contiguous, or non-contiguous manner. We can also state that, like protein sequences, gaps are present within the sequences that are to be discovered. This is effectively the lcs problem. When investigating this particular problem, it was noted that the field of bioinformatics have a solution for this particular, based on SA methods and statistical methods of analysis relating to information theory.

The BLAST algorithm uses SA methods and scoring statistics to align gapped sequences of biological data. A match report returned for a BLAST query calculates a set of scoring statistics for the alignments returned during a query. The statistics of interest to this disclosure are the score, and the E-value or P-Value. When a SA takes place, the sequences to be aligned can be thought of as occupying a search space. FIG. 18 represents the search space. A search space is a graph, with the one sequence along the y-axis, and the other along the x-axis. Each point represents a pairing of letters from each sequence. Each pair of letters has a score attributed to it from a scoring matrix. An alignment is a sequence of paired letters.

The BLAST algorithm was designed to report all of the statistically significant alignments. Algorithms like the Smith-Waterman outlined above would explore the entire search space between two sequences. To explore this space entirely is a time consuming and complex task. However minimizing the search space comes with the penalty of reduced sensitivity. Therefore, BLAST employs a number of different techniques to identify subsets of the search space that are of interest. These subsets are known as High Scoring Pairs (HSP). Broadly, the BLAST algorithm uses the following refinement procedure to identify HSP.

1. Seeding—This stage comprises of an identification of words in common. A word is defined here as a set of letters, such as PPF. BLAST identifies all the common words in both of the sequences. It is the region surrounding this word that will be subjected to further analysis.

2. Extension—For each word (seed) identified in the first stage, a localised alignment is performed. This alignment extends in either direction along the original seed, assessing the local sequence similarities. It stops when the number of dissimilar pairs reach a certain threshold. It is at this point that gap penalties are introduced.

3. Evaluation—The evaluation phase consists of a the alignment being performed with dynamic programming techniques, as outlined previously. The highest scoring alignments are selected during this phase, based on their score and other statistical values.

As outlined above, the score is derived from the alignment of the letters, and the scoring matrix. When considering the manner in which the E-Value and P-Value statistics are calculated, we must consider some properties of the scoring matrix used to provide values for the match. BLAST uses Karlin-Altschul statistics as a statistical basis. These state that a scoring matrix must have target frequencies and expected frequencies of each amino acid pair. Scoring matrices don't contain these, but they are implicit in the score. These frequencies are calculated along with additional properties derived from the scoring matrix called Lamdba ($\lambda$) and the Relative entropy (H). $\lambda$ is a scaling vector that adjusts for the original lod score, and allows for the calculation of a normalised score. H summarises the general behaviour of the scoring matrix. These values allow us to perform a calculation to determine the number of alignments expected by chance, E; where $E = KMNe^{-\lambda S}$.

In this equation, M is the search space, or number of letters in the query, N is the number of letters in the database, and K is a constant, which adjusts to take into account optimal scores found for two highly correlated local scores. Finally, $-\lambda S$ is the normalised score of the alignment. The normalised score is the raw score, or score given by the scoring matrix, converted into a raw score, which can then be used to calculated the bit score, which is given in the final alignment report. Thus, the E-value indicates how many alignments with a given score are expected by chance. The P-value indicates how often such an alignment will occur, and is derived from the E-value. These values are considered as interchangeable below the value of 0.001.

Normally, the BLAST algorithm is used for searching voluminous on-line databases of protein sequence information for sequence similarity and homology. This research made use of a stand-alone version of this algorithm know as WU-BLAST, which is suitable for demonstrating the technique. This stand-alone tool allows the creation of a custom database of protein sequences, which can then be searched with a query sequence. This query sequence is matched against all sequences within the database, and a match report is generated.

The WU-BLAST tool requires that the query sequence input files contain sequences of proteins. The protein letter alphabet only has 20 letters in it. Intuitively, it is necessary to convert the system call number sequences derived from the database into the protein letter alphabet. Yet there will be a large number of, system calls present within the trace files gathered from experimentation, the number depending on the OS. In the example above, there are up to 248 system calls, representing the number of system calls that are exported by Windows 2000. For demonstration of the present technique, the FILE subset of system calls was selected for analysis. This subset contains 28 system calls however from an empirical analysis of a Windows NT machine over a 24 hour period, it was found that some system calls were called more often than others, and a wide range of them were not called at all. Therefore, the 16 system calls belonging to the FILE subset were converted into protein letters, thus providing a suitable alphabet for use with bioinformatics tools that require files to be in FASTA format. Appendix B gives a list of all known system calls in the FILE subset and the appropriate conversion for those which were found within the trace file.

The FASTA file format is text based standard file format for representing biological sequence information. The FASTA file comprises a header, which would normally contain biological information about the organism the sequence belongs to. In this instance, the header tells us that it is a fingerprint sequence from E44, taken at timestamp 4:47:17:532.

```
>fingerprint_E44_4_47_17_532
PPFPPFPPPFPPPFPPFPMLLPLPHLPHLLPLQLQLPFCLLPELSLPHLPH

LPHSLDALLLQAFCCLPHLILLILPHLPFCL
```

The match report produced by WU-BLAST using the BLASTP option will have a first part listing of all the sequences matched in the query against the database, listing the most significant first. The listing significance is made from the bit score and P-Value of the match. After the listing of the most significant matches, a match section with individual query and subject lines is printed, along with match statistics. An example match section is outlined in FIG. 17. The subject line is the one found in the database, and the query line is the one submitted to the database for a match. In this example, the trace E44 was queried against the database. The resulting match shows that it was successfully aligned against a fingerprint that was taken from the file itself. The fingerprint E44__47__17__532 is listed at the top of the match section as the subject sequence.

In this match report, for this particular fingerprint, there have been two successful matches, hence two sets of statistics. In match reports there may be a number of different matches for a sequence in the database. The fittest match can be displayed first, with subsequent matches shown below. For the purposes of the rest of this work, when a match is made, generally only the first, most significant query and subject match will be displayed.

The query and subject lines show the start and end letter position within each sequence where the match was made. In the first query line, the match was found at letter position 2018, and ends at position 2080. Note that for formatting purposes, the report shows long sequence matches over a number of lines. Similarly, the subject sequence matches from start position 17 to end position 79. Supporting the match result are a number of statistics, which can for example be the Karlin-Anschul scoring statistics:

$$E = kmne^{-\lambda s}$$

$$\text{Relative Entropy}(H): H = \sum_{i=1}^{20} \sum_{j=1}^{i} q_{ij} s_{ij}$$

$$\text{Expected score}(E): E = \sum_{i=1}^{20} \sum_{j=1}^{i} p_i p_j s_{ij}$$

The P and E Value are both 2.9e-25, indicating low probability of a random match. The Score of 110 indicates a high score rate as given by the scoring matrix used to provide relative scoring for this WU-BLAST search. The identities score indicates how many characters match, and gives an idea of the number of gaps introduced to make the match. The positives score shows how many positive letter matches there are. This score relates to the letters contained within the scoring matrix. For example, within the matrix used to generate this alignment, an MM alignment has a positive score of 4. All positive matches are indicated within the match result as being sandwiched between the subject and query sequences. When confronted with the complex and voluminous data produced by data collection means such as the sTrace tool, it is necessary to find an effective way to analyse and navigate the data within the trace. Various statistical visualisation techniques are available. One suitable is the Mondrian tool (see http://sourceforge.net/projects/mondrian/). Mondrian is an interactive statistical visualisation tool. Given a tab delimited set of data, it can represent each column of data provided in various representations of the data such as bar charts, scatter plots, histograms, and so on. The data represented in the trace files are parsed and placed into a database, meaning that the data is in a columnar format and therefore compatible with Mondrian. The bar chart representation of trace data is of interest, as it allows the analyst various insights into the temporal nature of the data collected. The bar chart is configured to represent the number of system calls per time slice. Each system call is allocated a colour. The height of each bar indicates the total number of system calls in a particular slice. The bar is colour coded according to the relative frequency of individual system calls in the slice. The present disclosure is not limited to any particular combination or allocation of colours.

Figure 19:
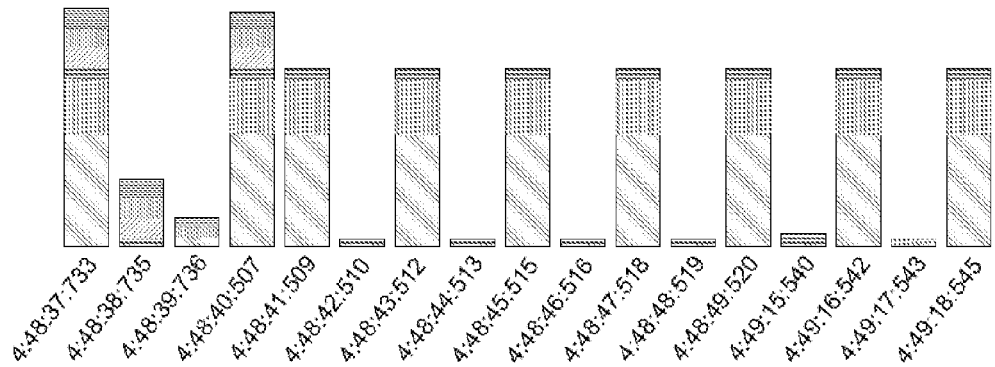
FIG. 19 illustrates a statistical representation of system call activity for a DUT, in a scenario where no user activity is occurring.
Figure 20:
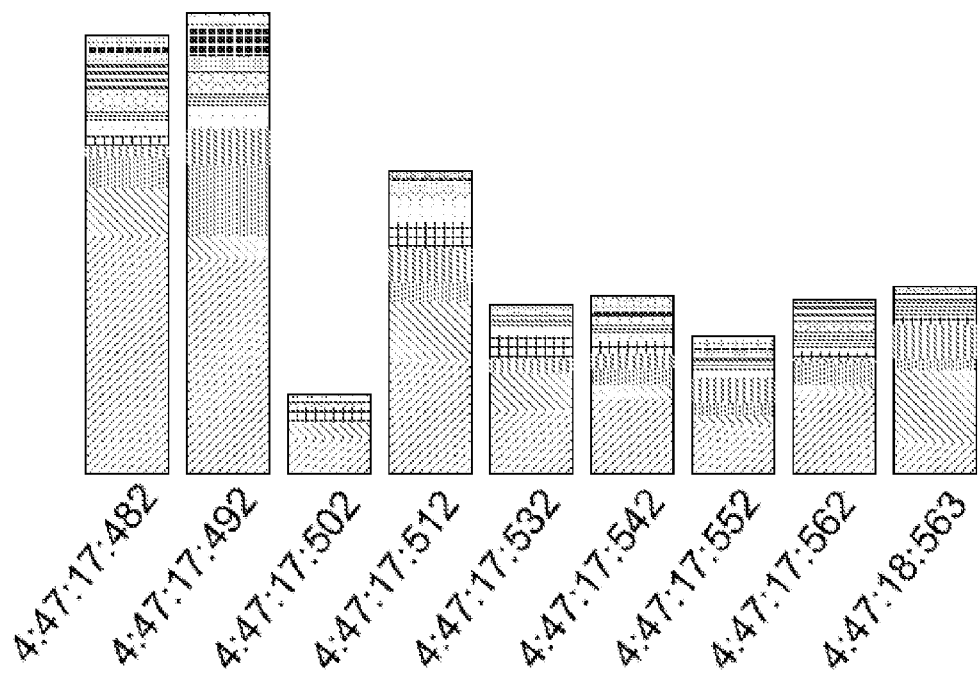
FIG. 20 illustrates a statistical representation of system call activity for a DUT, in a scenario where user activity is occurring.

FIG. 19 shows a Mondrian bar chart of a portion of the trace file E44, showing a time line of activity progressing from left to right. This illustration is representative of the activity discovered while there is no user activity on the DUT. FIG. 20 also shows activity from the FILE subset as recorded in trace E44, again showing a time line of activity progressing from left to right, and representing the case where there is user activity on the DUT. In FIGS. 19 and 20, the smaller bars indicate fewer system calls gathered at that particular time slice. A key showing the representation of system calls in FIGS. 19 and 20 is shown in FIG. 21.

The last column on the right hand side of FIG. 19 has a time slice of 4:49:18:545. It can be seen that in this example, this bar has three differently coloured portions, representing three different system calls, with the columnar height of each portion representing the number of times which each system call is made in each time slice. In the given example, the last column on the right hand side of FIG. 19 shows that the majority of system calls gathered within this time slice belong to NtOpenFile, the second most voluminous being NtQueryInformationFile, and NtDeviceloControlFile being the least prevalent system call.

FIG. 19 clearly shows that there is a repeating set of sequences of system calls. This set can clearly be seen at time slice 4:48:41:509. It can be seen to repeat at regular intervals within FIG. 19, until the end of the time line. Each of these columns indicate the same frequency of system calls within each time slice, and in this example a total of 72 system calls gathered per time slice.

These repeating patterns can then be subjected to a more in-depth analysis, including exploring the trace file at the given time slice and examining the associated system call parameters. This analysis can be used to decide if the repeating pattern is a background pattern that can be ignored for forensic purposes, or if it represents suspicious activity that should be investigated further.

The background patterns represent the "heartbeat" of a given DUT. This heartbeat can be filtered out from the trace data, thus reducing the amount of data that needs to be analysed.

Importantly however, it is to be noted that the "heartbeat" will be characteristic of the specific hardware and software set up of each DUT and thus is likely to be widely varied, even among DUT's with similar basic functionality. The heartbeat is composed of a series of system calls that are repeated by a specific DUT. The precise series of system calls in a heartbeat depends on a number of factors including the set of applications installed and running on the DUT; the versions of each of those applications, and the manner in which the software interacts with the network (which may depend on the network topology the particular DUT is part of). The heartbeat of a trace file can be then used in a court environment as evidence that a particular pattern of behaviour occurred on a particular DUT, based on the heartbeat match.

For example, in the illustration of FIG. 19 each column of the heartbeat (representing background system activities when there is no user activity on the DUT) could be made up of the system calls NtFsControlFile, NtOpenFile, NtQueryInformationFile, NtReadFile, NtWriteFile, NtDeviceloControlFile. When the parameter data associated with these tuples is investigated, it shows that this constant repetition is a fundamental operation of Windows 2000, whereby every single drive from letter A: to Z: is polled to supply information to the operating system for file access purposes. If these patterns of activity are known, they can be identified and removed from any further investigation, thus reducing the amount of work necessary.

FIG. 20 shows a section of the time line taken from an example trace file, E44. The time slices show relative frequency and amount of system calls gathered. Unlike the previous time slices illustrated in FIG. 19, a larger range of system calls are represented within each slice, and there are no obvious, repeating patterns of activity. For example, the section of the time line shown in FIG. 20 is important as it contains activities related directly to the scenario described in E44, or the activities of interest for this scenario. An in-depth analysis of the trace file shows that one of the time slices of interest is at time 4:47:17:532. The text saved during the text editor scenario can be found for example within the parameters of the (MS Windows) Notepad calls NtWriteFile, with the text to be saved to disk (or other suitable storage device) as one of the parameters. When examining this particular time slice, Mondrian shows the composition of the system calls, and frequency, but a sequence or pattern is not obvious. Mondrian is thus useful for providing instant awareness of interesting features of a trace file, and for helping identify a sequence or fingerprint.

The construction of a custom scoring matrix for the SA method will now be discussed. First, a BLOSUM matrix is calculated. Consider the following set of sequences, taken from the example above:

```
PAMGHDEFPPFPPDEHIKLDKKKGHS

PAMGHDEFPDFPPDEHIKLDKKKGHS

FAMGHDEFPPFPPDEHIKSFKKKGHS

PEMGHDEFPDFPPDEHIKLDKKKGH-

PAMGHDEFPPFPPD--IKLDKKKGHS
```

The first row of this aligned block will be used for this example, which is:

P
P
F
P
P

Before we calculate the lod matrix, an empirical frequency analysis must be performed on all observed letters in an alignment. This is achieved by building a frequency table of all observed proteins. The first step is to calculate all possible amino acid pairs ij.

For all possible ii pairings, a calculation is made thus: $i(i-1)/2$.

For all possible match ij pairings, the calculation is made thus: ij.

Once all of the possible pairings of ij have been calculated, we must also calculate the total sequence contribution. This is given by the following: $ws(s-1)/2$, where w is the width of the sequence, and s is the depth of the sequence.

With reference to the previous sequence, the pairing of PP=6, and FP=4. The sequence contribution for this alignment is w=1 and s=5 with a total contribution of 10. All of the pairing combinations are summed and stored in a frequency matrix indicating the frequency of each ij pair. The next step is to calculate the lod score, which is calculated with: $s_{ij}=\log_2(q_{ij}=e_{ij})$.

The lod score of pairing ij is $s_{ij}$. This is calculated with the observed probability $q_{ij}$, and expected probability $e_{ij}$.

The observed probability is calculated as follows. In total there are 20 protein letters. Therefore, let the total number of i, j pairs in the frequency table be $f_{ij}$ which gives:

$$q_{ij} = f_{ij} \bigg/ \sum_{i=1}^{20} \sum_{j=1}^{i} f_{ij}$$

Therefore, for the example, with 5 P letters and 1 F letter, for each i,j pair, where $f_{PP}=6$ and $f_{FP}=4$, one obtains $q_{PP}=6/10=0.6$ and $q_{FP}=4/10=0.4$.

Next we must calculate the expected probability. The probability of occurrence of the ith letter in an i,j pair is $$p_i = q_{ii} + \sum_{j \neq i} q_{ij}/2$$

so for the example column, the expected probability of a P in a pair is $(6+(4/2))/10=0.8$ and the expected probability of an F in a pair is $(4/2)/10=0.2$.

The expected probability $e_{ij}$ for each i,j pair is then $p_i p_j$ for i=j and $p_i p_j + p_j p_i = 2 p_i p_j$ for i≠j. For the example column, this gives an expected probability $e_{ij}$ of:

$PP = 0.8 \times 0.8 = 0.64$ $PF + FP = 2 \times (0.8 \times 0.2) = 0.32$ $FF = 0.2 \times 0.2 = 0.04$ Finally, the lod score is calculated (using $s_{ij} = \log_2(q_{ij} \div e_{ij})$) which gives
PP=−0.64
PF=−1.64
FF=−4.64

The scores can then be factored and rounded to the nearest integer to give a whole number to work with. If the frequency is expected, $s_{ij}=0$; if more than expected $s_{ij}>0$; if less than expected $s_{ij}<0$.

The lod matrix generated by the method just outlined gives a set of customised scoring values for evaluating the gathered data. This is beneficial as it allows us to evaluate the data gathered based on previously observed OS-specific empirical data, and not biological data. Yet, the manner in which the biological lod matrix is calculated does not entirely fit with the type of data collected from an OS, and so some adjustments were made to better reflect the scoring properties desired.

Firstly, the MSA shows substitution and pairing similarity along the generational timeline. The column used in the previous example (P; P; F; P; P) shows the substitution rate from one generation to another. With system call data, mutation and substitution in a biological sense does not take place. Instead, certain blocks or sequences of system calls are more likely to follow others, or occur within certain bounds. Therefore, instead of measuring $s_{ij}$ from one generation to the other, a scoring matrix that would be applicable to system call data measures $s_{ij}$ relative to the timeline of other system calls.

For example, FIG. 22 shows a MSA from a number of trace files which describe the same scenario. In this example, the data used to construct an evaluation matrix originates from a MSA of eight traces, all from the same experiment scenario run. The results of the MSA show that these traces have a number of highly conserved regions of alignments. These traces described a simple scenario which shows a text editor (in this case Notepad) opening a file, saving some text, and then closing. A MSA is performed, with an identity matrix to provide the basic scoring mechanism. FIG. 22 shows the direction of pairwise alignment interest of the biological field, and the direction of pairwise alignment of interest for digital forensic purposes. From the alignment, it can be noted that there is substitution happening, but this form of substitution does not describe the nature of the sequences being produced by the OS. Instead, as observed in the trace files analysed thus far, the substitution of letters is most likely to occur in system call trace data along the time line of activity, and not between generations of system call traces. Therefore, the tool that was developed to build the OS scoring matrix derives the lod score from proximity of system calls along the local substitution, horizontal time line, as opposite to the evolutionary, vertical time line.

The second consideration relates to fitting the measurements to the data that is used. For example, the FILE subset of system calls only uses 16 letters from the total protein alphabet available. This means the equation that calculates observed probability works on a smaller alphabet of i,j pairs, where the total number will be (1≤i≤j≤16). Therefore, the revised equation will be $$q_{ij} = f_{ij} \bigg/ \sum_{i=1}^{16} \sum_{j=1}^{i} f_{ij}$$

We performed experiments to test the validity of the BLAST SA technique, and these will now be discussed.

As mentioned above, WU-BLAST provides the ability to search for known sequences of system call activities within a trace, and assign a set of scoring metrics to the matched patterns and sequences. These metrics include a score for the sequence match, and a statistical score showing the likeliness of the sequence appearing at random.

For the tests, three trace files were used. These were E44: A Notepad save scenario; E414: The same Notepad save scenario, recorded at a different time to E44; and E51: The emptying of four files from the Recycle bin.

Each trace was chosen to provide a match for a particular fingerprint, comprising a sequence representing a file save request—sequence_4_47_17_532. Trace E44 should be a strong-positive query, as it is the origin of the fingerprint in the database. Trace E414 should be a positive query, as it is a trace taken of the same experiment scenario and should contain the same sequence. Trace E51 should be a negative query as it contains activities that are not the same as those contained in the previous traces. This trace may contain a match, but it will not be as strongly verified as the others.

Experiment 1

Aligning Sequences that have Originated from Non-Biological Data; Using BLOSUM62 Scoring Matrix This first experiment establishes whether WU-BLAST is able to align sequences of data that were non-biological in their origin. The database used for this query comprised the single fingerprint sequence_4_47_17_532.

The strong-positive query of E44 gives the high scoring match result shown in FIG. 23. The positive query of E414 gives the high scoring match result shown in FIG. 24, and the negative query of E51 gives the high scoring match result shown in FIG. 25.

The results show that the trace E44 does contain the sequence "sequence_4_47_17_532", as, when a match is executed an entirely complete and accurate, non-gapped alignment is returned, with a 100% Identity and Positive index. The sum score is high, as is a result of the 100% positive-match rate, which gives it a low P-Value. When we investigate trace E44, the pattern is found at the exact letter position reported in the query line. A similar result can be found with the trace E414, which returns values which are generally lower than that of the complete match made in the previous instance, but still provide a good match. The final, negative-query returns a marginally smaller score than the positive-query, yet it has a lower identity and positive score. Note that the main match sequences are at the very beginning of the query and subject sequences. This positive match of the negative sequence is part of background OS activity.

These results demonstrate the ability of WU-BLAST to align sequences that have not originated from a biological source. It also shows that a biological scoring system can give a higher match and therefore score to a sequence that originates from a trace, as well as a trace that contains similar activity. It has shown that matches will be made within traces

Experiment 2

Matching a Fake Sequence; Using BLOSUM62 Scoring Matrix

This experiment acts as a control in order to provide a baseline for other experiments, to check how the method would react to fake data. A fake protein sequence was generated, and a single-sequence database was created. The three trace files are once again queried.

The strong-positive query of E44 gives the high scoring match result shown in FIG. 26; the positive query of E414 gives the high scoring match result shown in FIG. 27; and the negative query of E51 gives the high scoring match result shown in FIG. 28.

All three traces shows a relatively low score, small Identity and Positive values and a high P-Value. The high P-value is an indication of a poor match. These results show that, although there are match results, the quality of these results are low, and thus provide a relative baseline for any subsequent matches with the scoring matrix for this match.

For this example the fake protein was created by designing a simple piece of code with a random number generator to generate the sequence. An alternative fake protein sequence for use as a baseline could be generated using weighted probabilities.

Experiment 3

Large Database Search; Using BLOSUM62 Scoring Matrix

The evaluation conducted in this experiment was designed to determine the sensitivity of the biological scoring scheme used when searching through a larger database of 110 sequences. The database is created from fingerprints extracted randomly from 14 trace files. Since the fingerprint of interest is still sequence_4_47_17_532, no traces were taken from the originating trace E44, or any other traces which were generated with precisely the same scenario-parameters. It should be noted at this point that the range of activities in the files entered into the database range from activities that were dissimilar to the activity scenario in E44, to activities that are similar in some respects. For example, creating a file on the disk, opening it with the application, and then saving it, differs very slightly to opening the application, and then creating the file through the application's save facilities. Thus, the database consists of a range of different types of activities.

The output shown in the following FIGS. 29-31 differs slightly from those previously encountered. The first values are an edited high-score list, with rankings added, of the first, last and ranking of the fingerprint of interest. This provides a relative measure of scoring across the fingerprints within the database matched to the query trace.

The strong-positive query of E44 gives the high scoring match result shown in FIG. 29; the positive query of E414 gives the high scoring match result shown in FIG. 30; and the negative query of E51 gives the high scoring match result shown in FIG. 31.

It can be seen that the strong-positive trace query scores highly in terms of Score, Identity and Positives values. The P-Value is low, and within a database with other entries, this is a good indicator that the match is authentic. The positive query is accordingly matched, as being ranked lower than the strong-positive match. It still achieves high Identity and Positive values, as well as a high Score.

The negative query returns with the same relatively low scores. Yet, the fingerprint of interest is ranked 25th, and the first-placed result is from the trace file E428. When the 24 preceding matches are examined, the explanation for their placement becomes clear. The traces of activity matched relate to background activity in the OS. These sequences can be considered as background noise present in every trace file, and from observations made from a number of different queries made with this type of data, will form a persistent and high scoring set of sequences. With regard to the other sequences, they still ranked lower than the positive-query. This matches expectations, as well as the previous results.

From experiments 1 to 3, it can be seen that WU-BLAST will rate the fingerprint of interest appropriately, yet for the strong-positive match, the fingerprint was out-scored by other match results. As discussed, there are various reasons for this result. Yet, it highlights one of the main drawbacks of the BLOSUM62 scoring matrix. A series of experiments will now be described using the custom matrix as described previously.

Experiment 4

Matching a Fake Sequence; Using Custom Scoring Matrix

The fake protein match of Experiment 2 provided a control, or baseline of relative measure for the scoring matrix employed in the match. Similarly, a baseline experiment was performed for the custom built scoring matrix. The database and query files are all exactly the same, and the only variable that differs is the substitution matrix.

The strong-positive query of E44 gives the high scoring match result shown in FIG. 32; the positive query of E414 gives the high scoring match result shown in FIG. 33; and the negative query of E51 gives the high scoring match result shown in FIG. 34.

All three matches report low Scores. What is of interest is the fact that the scores are again ranked in terms of the strong-positive, positive and negative queries. The answer for this is likely to be found in the manner in which the scoring matrix was constructed. Because it was an evaluation matrix, it was made from a limited (yet still relatively substantial) set of empirical data. The highlight of this run is that it shows the custom scoring matrix performs in a similar manner to the BLOSUM62 matrix, insofar that it will score a fake, or non-relevant protein with low Score, Identity, and Positive values, and a high P-Value, indicating the weakness of the match. These results provide a control measure for the next set of experimental results.

Experiment 5

Large Database Search; Using Custom Scoring Matrix

The following results were obtained from exactly the same data and methods described in Experiment 3. The only variable that has changed is the scoring matrix. In this evaluation, the custom scoring matrix shown in Appendix C is used.

The strong-positive query of E44 gives the high scoring match result shown in FIG. 35; the positive query of E414 gives the high scoring match result shown in FIG. 36; and the negative query of E51 gives the high scoring match result shown in FIG. 37.

The strong-positive result shows that it is ranked first in the high score listing. When compared against Experiment 3, the fingerprint of interest is ranked 25th. The match result is of interest, as there is a 100% Identity result, indicating an exact sequence match, whereas the Positive score is only 34%. The score assigned to this sequence is high, at 110, and the P-Value is low. Note that the last value listed in the high score list has a score and P-Value similar to those described in the fake protein match.

The result for the negative query is noteworthy, as the sequence to be found in the database does not get matched anywhere within the file. Yet, the two top high scoring sequences are extracts from the same trace file, E51. Of note is the lower overall score assigned to the matches by the scoring matrix. This is a function of the results and scores within the matrix, thus indicating that a direct correlation between scores of the BLOSUM62 and the scores of the custom matrix of Appendix C scores is not possible. Instead, the relative scores assigned by the fake protein match are a valid control or baseline indication.

When considering the efficacy of the custom scoring matrix of Appendix C, and the relatively limited set of training data used to build it, the scoring scheme appears to fit the data that needs to be aligned. Two interesting results are those of the strong-positive and negative queries. The fingerprint of interest is not found, or ranked for the negative query. However, two fingerprints that were extracted from this trace, and were in the database, were positively matched, and ranked first and second. What is of even more prominence in this instance is that fact that there was no empirical data from the activities described in E51 explicitly included in the construction of the scoring matrix. In spite of this, sequences within this file are matched, and scored highly.

With relation to the strong-positive query and the positive query, it is possible to state that the first-rank given to the strong-positive query is an indication of an exact match, and is the type of score that we can expect from an authentic match result. The positive query result indicates that the fingerprint of interest is within the positive-query file, as there is a good score in relation to the first and last rankings in the high score, with a low P-Value. From the previous experiments, it is already known that this sequence can be matched. It can be stated that the scoring statistics assigned to it as by the scoring matrix NM_L5_D7326 are of merit, and reflect the structural data of system calls. Thus, this type of scoring mechanism provides a DF investigator with an empirical method to verify low-level system call requests on the DUT.

The experiments conducted in this Section show that the WU-BLAST SA technique with a BLOSUM62 scoring matrix can match and score accurately exact or contiguous, and similar or non-contiguous sequences of system call data from the FILE subset encoded into the protein Amino Acid letter alphabet. It will assign a correspondingly low score and ranking to a trace file that does not contain the fingerprint of interest. When using this technique in a larger database of sequences, it can be stated that the scoring mechanisms assigned by the BLOSUM62 matrix are sensitive enough to assign an appropriately high ranking to matches discovered within the queries. It can also be stated that when aligning a fake protein, a suitably low P-Value is assigned to the unauthentic sequence, thus providing a set of control results against which the judge other alignments. When employing this technique to match and score sequences with the custom built scoring matrix of Appendix C, it can be stated that the set of scores and statistics are a more accurate indicator of system call request structure.

Various improvements and modifications can be made to the above without departing from the scope of the invention.

APPENDIX A

| Protein Amino Acid Alphabet | |
|---|---|
| Amino Acid | Letter |
| Alanine | A |
| Arginin | R |
| Asparagine | N |
| Aspartic Acid | D |
| Cysteine | C |
| Glutamine Acid | E |
| Glutamine | Q |
| Glycine | G |
| Histidine | H |
| Isoleucine | I |
| Leucine | L |
| Lysine | K |
| Methionine | M |
| Phenylalanine | F |
| Proline | P |
| Serine | S |
| Threonine | T |
| Tryptophan | W |
| Tyrosine | Y |
| Valine | V |

APPENDIX B

| System Call to Protein Conversion | | |
|---|---|---|
| System Call Number | Amino Acid | FILE Function Name |
| 1 | | NtSetQuotaInformationFile |
| 2 | | NtQueryQuotaInformationFile |
| 3 | A | NtWriteFile |
| 4 | | NtWriteFileGather |
| 5 | R | NtUnlockFile |
| 6 | | NtSetVolumeInformationFile |
| 7 | C | NtSetInformationFile |
| 8 | | NtSetEaFile |
| 9 | | NtReadFileScatter |
| 10 | D | NtReadFile |
| 11 | E | NtQueryVolumeInformationFile |
| 12 | | NtQueryOleDirectoryFile |
| 13 | F | NtQueryInformationFile |
| 14 | G | NtQueryFullAttributesFile |
| 15 | | NtQueryEaFile |
| 16 | H | NtQueryDirectoryFile |
| 17 | I | NtQueryAttributesFile |
| 18 | S | NtNotifyChangeDirectoryFile |
| 19 | K | NtLockFile |
| 20 | L | NtFsControlFile |
| 21 | M | NtDeviceIoControlFile |
| 22 | | NtCreateNamedPipeFile |
| 23 | | NtCreateMailslotFile |
| 24 | | NtCancelIoFile |
| 25 | N | NtFlushBuffersFile |
| 26 | | NtDeleteFile |
| 27 | P | NtOpenFile |
| 28 | Q | NtCreateFile |

APPENDIX C

| Custom Scoring Matrix | | | | | | | | | | | | | | | | |
|---|---|---|---|---|---|---|---|---|---|---|---|---|---|---|---|---|
|  | A | R | C | D | E | F | G | H | I | S | K | L | M | N | P | Q | * |
| A | 1 | 0 | 0 | 3 | -6 | -7 | 0 | -8 | -6 | -7 | 0 | 0 | -1 | 4 | -6 | -5 | -11 |
| R | 0 | 0 | 0 | 0 | 0 | 0 | 0 | 0 | 0 | 0 | 0 | 0 | 0 | 0 | 0 | 0 | -11 |
| C | 0 | 0 | 5 | 0 | 2 | -1 | 1 | -3 | -4 | 1 | 0 | -2 | -5 | 0 | -10 | 1 | -11 |
| D | 3 | 0 | 0 | 0 | -5 | -5 | 0 | -6 | -4 | -3 | 0 | 0 | 0 | -3 | -6 | -4 | -11 |
| E | -6 | 0 | 2 | -5 | 5 | -2 | 2 | -1 | -1 | 3 | 0 | 0 | -6 | 0 | -5 | 3 | -11 |
| F | -7 | 0 | -1 | -5 | -2 | -1 | 0 | -8 | -7 | -3 | 0 | -6 | -5 | -11 | 1 | -4 | -11 |
| G | 0 | 0 | 1 | 0 | 2 | 0 | 0 | 0 | 0 | 0 | 0 | 2 | 0 | 0 | 0 | 2 | -11 |
| H | -8 | 0 | -3 | -6 | -1 | -8 | 0 | 6 | 0 | 3 | 0 | 1 | -8 | 0 | -2 | -5 | -11 |
| I | -6 | 0 | -4 | -4 | -1 | -7 | 0 | 0 | 3 | 0 | 0 | 2 | -2 | -2 | -6 | -4 | -11 |
| S | -7 | 0 | 1 | -3 | 3 | -3 | 0 | 3 | 0 | 11 | 0 | 1 | -5 | 0 | -3 | -2 | -11 |
| K | 0 | 0 | 0 | 0 | 0 | 0 | 0 | 0 | 0 | 0 | 0 | 0 | 0 | 0 | 0 | 0 | -11 |
| L | 0 | 0 | -2 | 0 | 0 | -6 | 2 | 1 | 2 | 1 | 0 | 0 | -2 | -1 | -5 | 1 | -11 |
| M | -1 | 0 | -5 | 0 | -6 | -5 | 0 | -8 | -2 | -5 | 0 | -2 | 4 | -5 | -2 | -2 | -11 |
| N | 4 | 0 | 0 | -3 | 0 | -11 | 0 | 0 | -2 | 0 | 0 | -1 | -5 | 9 | -9 | -4 | -11 |
| P | -6 | 0 | -10 | -6 | -5 | 1 | 0 | -2 | -6 | -3 | 0 | -5 | -2 | -9 | 0 | -10 | -11 |
| Q | -5 | 0 | 1 | -4 | 3 | -4 | 2 | -5 | -4 | -2 | 0 | 1 | -2 | -4 | -10 | 4 | -11 |
| * | -11 | -11 | -11 | -11 | -11 | -11 | -11 | -11 | -11 | -11 | -11 | -11 | -11 | -11 | -11 | -11 | 1 |

This matrix is named NM_L5_d7326
Entries for the NACHO Matrix, scale of ln( )
Factored to: 2 Rounded to: 0

The invention claimed is:

1. A digital forensic analysis method performed in a processor, the method comprising the steps of:
    collecting historical system call data from a digital computing system (DCS), the historical system call data corresponding to a plurality of system calls which comprise system calls corresponding to suspicious activity performed on the DCS;
    converting the collected historical system call data to form a historical sequence comprising a string of sequence elements in which each system call is represented as solely one sequence element;
    selecting from a system call sequence database a test sequence comprising a string of sequence elements in which each sequence element represents a system call, wherein the system calls represented in the test sequence correspond to the suspicious activity performed on the DCS, the system calls which correspond to the suspicious activity being represented by suspicious activity sequence elements that are non-contiguous in at least one of the historical sequence and the test sequence; and
    applying, via a computing, processor, a non-contiguous sequence alignment algorithm to the historical sequence and the test sequence during a post-event sequence matching process, the non-contiguous sequence alignment algorithm being operative to match the suspicious activity sequence elements of the historical sequence with the suspicious activity sequence elements of the test sequence to thereby detect suspicious activity reflected in the historical system call data collected from the DCS, wherein the non-contiguous sequence alignment algorithm is operative to identify a longest sequence of suspicious activity sequence elements common to the historical sequence and the test sequence, and wherein applying a non-contiguous sequence alignment algorithm comprises use of a biological sequence matching algorithm.

2. The method of claim 1, wherein the sequence elements are alphanumeric characters of the Roman alphabet.

3. The method of claim 1, wherein said biological sequence matching algorithm uses Karlin-Altschul statistics as a basis for determining sequence alignment.

4. The method of claim 1, further comprising performing a frequency domain analysis of the historical system call data.

5. The method of claim 4, wherein the frequency domain analysis comprises assigning a value as an amplitude to each system call.

6. The method of claim 4, wherein the frequency domain analysis comprises constructing a signal on a basis of a number of occurrences of individual alphabets per unit time in the test sequence.

7. The method of claim 1, wherein an entry in the system call sequence database is constructed by:
    running a test scenario on the DCS and collecting system call data generated by the test scenario;
    converting said system call data to a test sequence in which one system call is represented as solely one sequence element; and
    recording a sequence of systems calls as a database entry corresponding to the test scenario.

8. The method of claim 1, wherein said system call sequence database is unique to a given DCS.

9. The method of claim 1, wherein said historical system call data is collected at an interface between kernel and user space of the DCS.

10. The method of claim 9, wherein said historical system call data is collected by a software wrapper that intercepts all system calls made between the kernel and the user space.

11. The method of claim 1, further comprising the step of emulating a user interface and using the test sequence of system calls to recreate graphically user actions on an emulated graphical user interface.

12. The method of claim 11, wherein said emulation step comprises:
    reading ahead of a displayed time slice and compiling the data; and
    subsequently displaying the simulated user experience in an order as input by a user of the DCS.

13. The method of claim 1, wherein at least one of the steps carried out following collection of data from a device under test (DUT) are carried out at a location remote from at least one of the DUT and a DUT host organization.

14. The method according to claim 1, wherein identifying the longest sequence of suspicious activity sequence elements common to the historical sequence and the test sequence comprises:
    determining an extent of similarity between the suspicious activity sequence elements comprised in the historical sequence and the suspicious activity sequence elements comprised in the test sequence, wherein at least one gap between suspicious activity sequence elements comprised in at least one of the historical sequence and the test sequence is weighted less heavily than the suspicious activity sequence elements during the determination of extent of similarity.

15. A computer-program product comprising a non-transitory computer-readable medium having computer-readable program code embodied therein, the computer-readable program code adapted to be executed to implement a digital forensic analysis method comprising:
- collecting historical system call data from a digital computing system (DCS), the historical system call data corresponding to a plurality of system calls which comprise system calls corresponding to suspicious activity performed on the DCS;
- converting the collected historical system call data to form a historical sequence comprising a string of sequence elements in which each system call is represented as solely one sequence element;
- selecting from a system call sequence database a test sequence comprising a string of sequence elements in which each sequence element represents a system call, wherein the system calls represented in the test sequence correspond to the suspicious activity performed on the DCS, the system calls which correspond to the suspicious activity being represented by suspicious activity sequence elements that are non-contiguous in at least one of the historical sequence and the test sequence; and
- applying a non-contiguous sequence alignment algorithm to the historical sequence and the test sequence during a post-event sequence matching process, the non-contiguous sequence alignment algorithm being operative to match the suspicious activity sequence elements of the historical sequence with the suspicious activity sequence elements of the test sequence to thereby detect suspicious activity reflected in the historical system call data collected from the DCS, wherein the non-contiguous sequence alignment algorithm is operative to identify a longest sequence of suspicious activity sequence elements common to the historical sequence and the test sequence, and wherein applying a non-contiguous sequence alignment algorithm comprises use of a biological sequence matching algorithm.

16. A computing device for digital forensic analysis, the computing device comprising:
- a processor for executing computer readable instructions that, when executed, cause the computing device to:
- collect historical system call data from a digital computing system (DCS), the historical system call data corresponding to a plurality of system calls which comprise system calls corresponding to suspicious activity performed on the DCS;
- convert the collected historical system call data to form a historical sequence comprising a string of sequence elements in which each system call is represented as solely one sequence element;
- select from a system call sequence database a test sequence comprising a string of sequence elements in which each sequence element represents a system call, wherein system calls represented in the test sequence correspond to the suspicious activity performed on the DCS, the system calls which correspond to the suspicious activity being represented by suspicious activity sequence elements that are non-contiguous in at least one of the historical sequence and the test sequence; and
- apply a non-contiguous sequence alignment algorithm to the historical sequence and the test sequence during a post-event sequence matching process, the non-contiguous sequence alignment algorithm being operative to match the suspicious activity sequence elements of the historical sequence with the suspicious activity sequence elements of the test sequence to thereby detect suspicious activity reflected in the historical system call data collected from the DCS, wherein the non-contiguous sequence alignment algorithm is operative to identify a longest sequence of suspicious activity sequence elements common to the historical sequence and the test sequence, and wherein applying a non-contiguous sequence alignment algorithm comprises use of a biological sequence matching algorithm.

\* \* \* \* \*